United States Patent
Todorokihara

(10) Patent No.: US 11,809,513 B2
(45) Date of Patent: Nov. 7, 2023

(54) SIGNAL PROCESSING METHOD AND SIGNAL PROCESSING DEVICE

(71) Applicant: Seiko Epson Corporation, Tokyo (JP)

(72) Inventor: Masayoshi Todorokihara, Suwa (JP)

(73) Assignee: SEIKO EPSON CORPORATION

( * ) Notice: Subject to any disclaimer, the term of this patent is extended or adjusted under 35 U.S.C. 154(b) by 154 days.

(21) Appl. No.: 17/380,077

(22) Filed: Jul. 20, 2021

(65) Prior Publication Data
US 2022/0027433 A1    Jan. 27, 2022

(30) Foreign Application Priority Data
Jul. 21, 2020    (JP) ................. 2020-124345

(51) Int. Cl.
*G06F 17/15* (2006.01)
*G06F 17/14* (2006.01)

(52) U.S. Cl.
CPC .............. *G06F 17/15* (2013.01); *G06F 17/14* (2013.01)

(58) Field of Classification Search
CPC ............. G06F 17/14–148; G06F 17/15; G06F 17/156; H03H 2017/0081; H03H 2017/0298; H03H 17/0213; H03H 17/0233; H03H 2218/10
See application file for complete search history.

(56) References Cited

U.S. PATENT DOCUMENTS

| | | | | |
|---|---|---|---|---|
| 2008/0320070 A1* | 12/2008 | Swarts | ............... | G06F 17/15 708/422 |
| 2013/0006551 A1* | 1/2013 | Sako | ............... | G01H 1/14 702/56 |
| 2019/0384757 A1* | 12/2019 | Garrett | ............... | A61B 5/369 |

OTHER PUBLICATIONS

N.M. Gibson et al., Detection of fetal electrocardiogram signals using matched filters with adaptive normalisation, Med. Biol. Eng. Comput., 35, 1997 (Year: 1997).*
Matched Filters, Chp 3 lecture notes, 2013, found at https://ee.eng.usm,my/mandeep/EEE436, p. 7 (Year: 2013).*
Pete Sopcik and Dara O'Sullivan, "How Sensor Performance Enables Condition-Based Monitoring Solutions", Analog Dialogue 53-06, Jun. 2019, 5 pages.

* cited by examiner

*Primary Examiner* — Emily E Larocque
(74) *Attorney, Agent, or Firm* — Harness, Dickey & Pierce, P.L.C.

(57) ABSTRACT

A signal processing method includes: a processing target signal generation step of generating a processing target signal that is a time-series signal, based on a source signal that is a time-series signal corresponding to a physical quantity generated in a steady state of a target object; and a correlated signal generation step of performing correlation filter processing between a template signal that is a time-series signal generated based on the source signal, and the processing target signal, and generating a correlated signal that is a time-series signal.

17 Claims, 17 Drawing Sheets

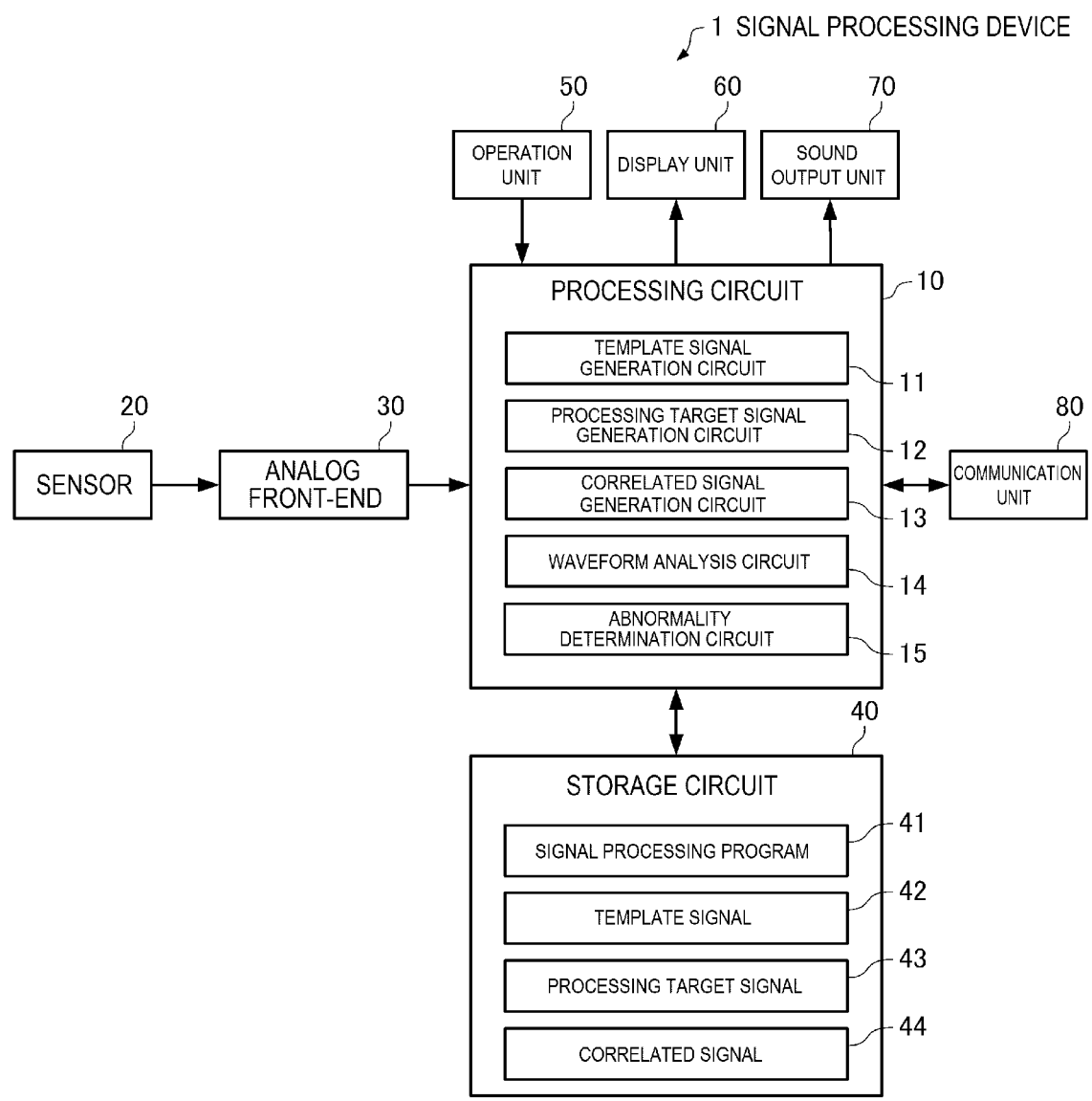

SIGNAL PROCESSING METHOD AND SIGNAL PROCESSING DEVICE

The present application is based on, and claims priority from JP Application Serial Number 2020-124345, filed Jul. 21, 2020, the disclosure of which is hereby incorporated by reference herein in its entirety.

BACKGROUND

1. Technical Field

The present disclosure relates to a signal processing method and a signal processing device.

2. Related Art

Synchronous averaging is known as a technique for reducing a component that is asynchronous with a target steady repetitive waveform. However, this technique has a problem in that it also reduces a waveform component correlated with the repetitive waveform but not synchronous with the timing of synchronous averaging. As a method for coping with this problem, Pete Sopcik and Dara O'Sullivan, "How Sensor Performance Enables Condition-Based Monitoring Solutions", Analog Dialogue 53-06, June 2019, proposes a method of performing envelope processing on a target steady repetitive time-series waveform and then performing spectral analysis on the resulting waveform.

However, in the envelope processing, the time-series waveform needs to be smoothed after being rectified and a proper cut-off frequency of a smoothing filter needs to be selected so that a desired signal component is properly extracted. Therefore, the method described in Pete Sopcik and Dara O'Sullivan, "How Sensor Performance Enables Condition-Based Monitoring Solutions", Analog Dialogue 53-06, June 2019, results in complex computations.

SUMMARY

A signal processing method according to an aspect of the present disclosure includes: a processing target signal generation step of generating a processing target signal that is a time-series signal, based on a source signal that is a time-series signal corresponding to a physical quantity generated in a steady state of a target object; and a correlated signal generation step of performing correlation filter processing between a template signal that is a time-series signal generated based on the source signal, and the processing target signal, and generating a correlated signal that is a time-series signal.

A signal processing device according to another aspect of the present disclosure includes: a processing target signal generation circuit generating a processing target signal that is a time-series signal, based on a source signal that is a time-series signal corresponding to a physical quantity generated in a steady state of a target object; a storage circuit storing a template signal that is a time-series signal generated based on the source signal; and a correlated signal generation circuit performing correlation filter processing between the template signal and the processing target signal and generating a correlated signal that is a time-series signal.

BRIEF DESCRIPTION OF THE DRAWINGS

FIG. 30 shows an example of a configuration of a signal processing device according to the seventh embodiment.

DESCRIPTION OF EXEMPLARY EMBODIMENTS

Preferred embodiments of the present disclosure will now be described in detail with reference to the drawings. The embodiments described below should not unduly limit the content of the present disclosure described in the appended claims. Not all the components described below are essential components of the present disclosure.

1. First Embodiment

1-1. Signal Processing Method

Figure 1:
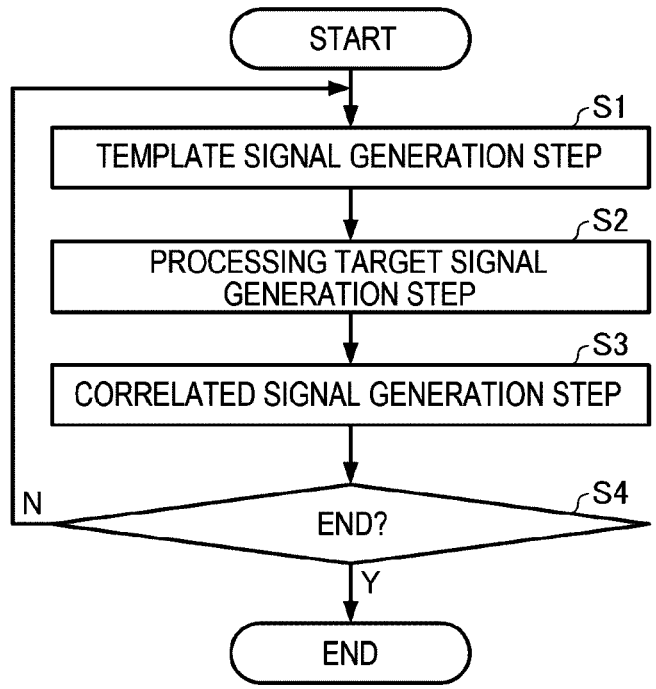
FIG. 1 is a flowchart showing a procedure of a signal processing method according to a first embodiment.

FIG. 1 is a flowchart showing a procedure of a signal processing method according to a first embodiment.

As shown in FIG. 1, the signal processing method according to the first embodiment includes a template signal generation step S1, a processing target signal generation step S2, and a correlated signal generation step S3. The signal processing method according to this embodiment is carried out, for example, by a signal processing device 1.

First, in the template signal generation step S1, the signal processing device 1 generates a template signal that is a time-series signal, based on a source signal that is a time-series signal corresponding to a physical quantity generated in a steady state of a target object. The target object is an object on which signal processing is to be performed. The target object is not limited to any particular type. For example, the target object may be any one of various devices such as a motor having a rotation mechanism and a vibration mechanism, or may be a structure such as a bridge or a building that vibrates due to an external force, or may be an electrical circuit that generates a periodic (or cyclic) signal. The steady state of the target object is the state where the target object is repeating a predetermined movement. The steady state of the target object may be, for example, the state where the device or structure as the target object is rotating or vibrating, the state where the electrical circuit as the target object is generating a periodic (or cyclic) signal, or the like. The physical quantity is not limited to any particular type and may be, for example, acceleration, angular velocity, pressure, current, voltage or the like.

Next, in the processing target signal generation step S2, the signal processing device 1 generates a processing target signal that is a time-series signal, based on the source signal.

Next, in the correlated signal generation step S3, the signal processing device 1 performs correlation filter processing between the template signal generated in the step S1 and the processing target signal generated in the step S2 and thus generates a correlated signal that is a time-series signal.

The signal processing device 1 repeats the steps S1, S2, S3 until the signal processing ends (N in step S4).

In this way, in this embodiment, the template signal and the processing target signal are updated until the signal processing ends. As the template signal is updated, even when the period of a periodic signal component included in the processing target signal changes due to change with time of the target object, a correlated signal including this signal component can be generated.

Figure 2:
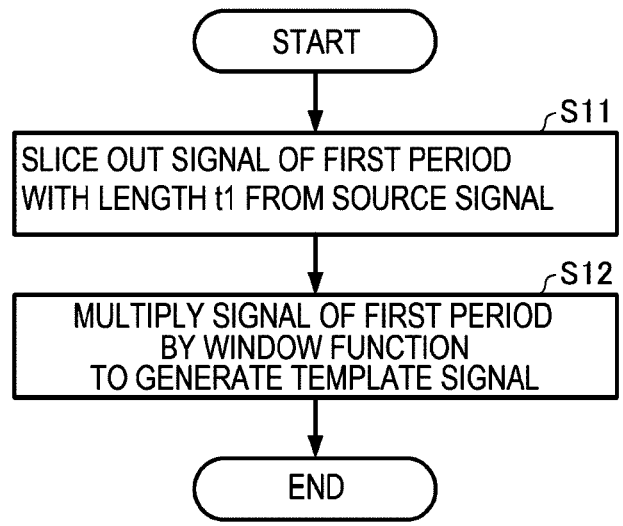
FIG. 2 is a flowchart showing an example of a procedure of a template signal generation step in the first embodiment.

FIG. 2 is a flowchart showing an example of the procedure of the template signal generation step S1 shown in FIG. 1.

As shown in FIG. 2, in the template signal generation step S1, the signal processing device 1 first slices out a signal of a first period with a length t1 from a source signal (step S11).

Next, the signal processing device 1 multiplies the signal of the first period by a window function and thus generates a template signal (step S12) and ends the template signal generation step S1.

In this way, in this embodiment, the template signal is a signal based on the signal of the first period sliced out of the source signal, and its time length is equal to the length t1 of the first period. Also, the template signal is a signal generated by multiplying the signal sliced out of the source signal by the window function. Thus, the influence of a noise on the correlated signal due to discontinuity of the first sample value and the last sample value of the template signal can be reduced. The window function is not limited to any particular type and may be, for example, a Hanning window function, a rectangular window function, a Gaussian window function, a Hamming window function, a Blackman window function, a Kaiser window function or the like.

Figure 3:
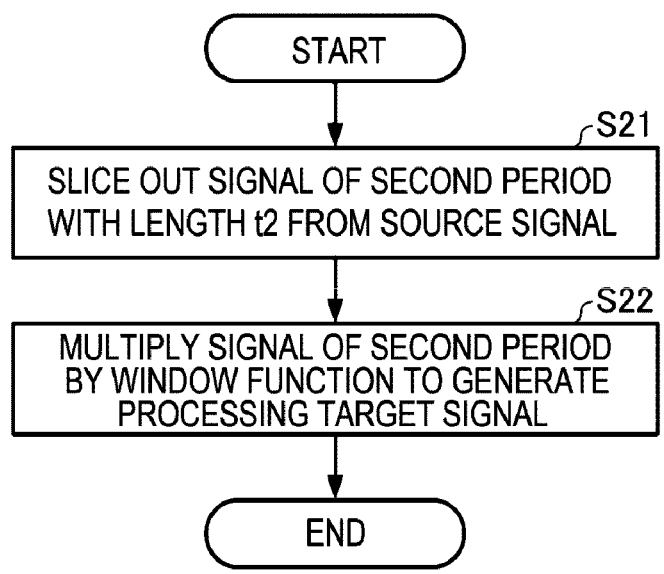
FIG. 3 is a flowchart showing an example of a procedure of a processing target signal generation step in the first embodiment.

FIG. 3 is a flowchart showing an example of the procedure of the processing target signal generation step S2 shown in FIG. 1.

As shown in FIG. 3, in the processing target signal generation step S2, the signal processing device 1 first slices out a signal of a second period with a length t2 that does not overlap the first period, from the source signal (step S21).

Next, the signal processing device 1 multiplies the signal of the second period by a window function and thus generates a processing target signal (step S22) and ends the processing target signal generation step S2.

In this way, in this embodiment, the processing target signal is a signal based on the signal of the second period that is sliced out of the source signal and does not overlap the first period, and its time length is equal to the length t2 of the second period. Since there is no period in which the template signal and the processing target signal include completely the same signal, an ergodic signal component such as a noise can be effectively reduced by the correlation filter processing.

The processing target signal is a signal generated by multiplying the signal sliced out of the source signal by the window function. Thus, the influence of a noise on the correlated signal due to discontinuity of the first sample value and the last sample value of the processing target signal can be reduced. The window function is not limited to any particular type and may be, for example, a Hanning window function, a rectangular window function, a Gaussian window function, a Hamming window function, a Blackman window function, a Kaiser window function or the like.

In this embodiment, the source signal is a digital signal with a constant sampling rate, and the template signal and the processing target signal, both sliced out of the source signal, have the same sampling period (or the same sampling cycle) Δt. Thus, in the correlation filter processing, the orthogonality of each of signal components having different frequencies is maintained, and signal components having the same frequency are properly extracted. However, the template signal and the processing target signal may have different sampling periods (or different sampling cycles) from each other. In this case, the signal processing device 1 may linearly convert at least one of the template signal and the processing target signal in relation to time axis so that the template signal and the processing target signal have the same sampling period (or the same sampling cycle), before the correlated signal generation step S3.

In this embodiment, the template signal is shorter than the processing target signal. That is, t1<t2.

Figure 4:
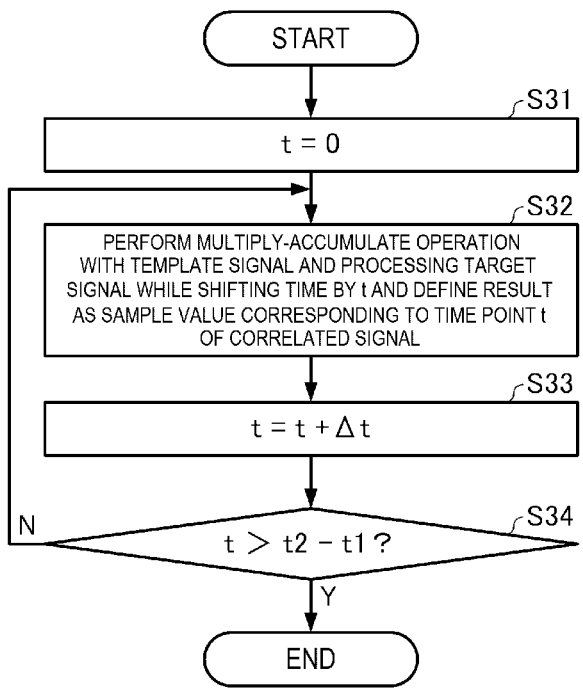
FIG. 4 is a flowchart showing an example of a procedure of a correlated signal generation step in the first embodiment.

FIG. 4 is a flowchart showing an example of the procedure of the correlated signal generation step S3 in FIG. 1.

As shown in FIG. 4, in the correlated signal generation step S3, the signal processing device 1 first sets t=0 (step S31), performs a multiply-accumulate operation with the template signal and the processing target signal while shifting the time by t, and defines the result as a sample value corresponding to the time point t of the correlated signal (step S32).

Next, the signal processing device 1 sets t=t+Δt (step S33) and repeats the steps S32, S33 until t>t2−t1 (N in step S34). When t>t2−t1 (Y in step S34), the signal processing device 1 ends the correlated signal generation step S3.

In this way, in this embodiment, the correlation filter processing is a multiply-accumulate operation with the template signal and the processing target signal. The signal processing device 1 performs multiply-accumulate operation with the template signal and the processing target signal while shifting the time by t until coinciding with the difference between the time length t2 of the processing target signal and the time length t1 of the template signal, and thus generates a correlated signal. The envelope of the correlated signal generated by the correlation filter processing and the envelope of the processing target signal are nonlinear. That is, in this embodiment, there is no constraint on maintaining the linearity of the envelope before and after the correlation filter processing. Therefore, an ergodic noise included in the processing target signal is efficiently reduced.

The multiply-accumulate operation may be FIR (finite impulse response) filter processing on the processing target signal. In this case, the coefficient of the FIR filter processing is defined based on the template signal. For example, 2n sample values included in the processing target signal are sequentially inputted to an n1-tap FIR filter using n1 sample values included in the template signal as n1 coefficient values. Thus, a correlated signal is acquired as an output signal from the FIR filter. Here, n1=t1/Δt and n2=t2/Δt. In this way, employing the FIR filter processing as the multiply-accumulate operation enables easy implementation of the correlation filter processing.

In this embodiment, the source signal includes a plurality of periodic signal components. The plurality of signal components have different cycles from each other. Thus, the target object can have a plurality of mechanisms having different clock frequencies from each other. The time length of the template signal is longer than the cycle of a first signal component, of the plurality of signal components. The difference t2−t1 between the time length of the processing target signal and the time length of the template signal is longer than the cycle of the first signal component. Thus, the correlated signal includes the first signal component over one or more cycles. Therefore, the first signal component can be regarded as an analysis target.

Figure 5:
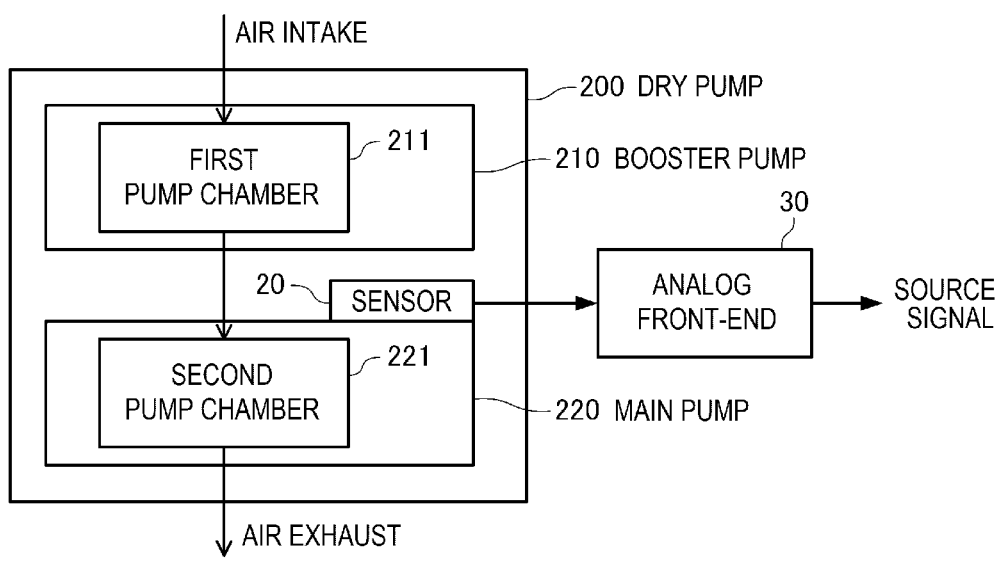
FIG. 5 shows a specific example of a target object and a source signal.

FIG. 5 shows a specific example of the target object and the source signal. In the example shown in FIG. 5, the target object is a dry pump 200. The dry pump 200 has a booster pump 210 and a main pump 220. The booster pump 210 has a first pump chamber 211. A motor, a gear, a bearing and the like, not illustrated, that are built inside the booster pump 210 act to rotate, at a high speed, a rotor, not illustrated, that is accommodated in the first pump chamber 211. Thus, the first pump chamber 211 sucks in air from outside the dry pump 200 and exhausts the air.

The main pump 220 has a second pump chamber 221. A motor, a gear, a bearing and the like, not illustrated, that are built inside the main pump 220 act to rotate, at a high speed, a rotor, not illustrated, that is accommodated in the second pump chamber 221. Thus, the second pump chamber 221 sucks in the air exhausted from the first pump chamber 211 and exhausts the air to outside the dry pump 200.

In the steady state of the dry pump 200, the motor, the gear, the bearing, the rotor and the like built inside the booster pump 210 and the motor, the gear, the bearing, the rotor and the like built inside the main pump 220 are operating and the operations of these components generate vibrations with various frequencies. A sensor 20 is installed at a position to which the vibrations are transmitted. The sensor 20 may be any sensor that can detect vibrations and may be, for example, an acceleration sensor or an angular velocity sensor. The sensor 20 may be configured to be able to detect these vibrations at least slightly and its place of installation is not restricted very much.

An output signal from the sensor 20 is inputted to an analog front-end 30. The analog front-end 30 performs amplification and A/D (analog-to-digital) conversion of the output signal from the sensor 20 and outputs a source signal that is a digital time-series signal.

FIGS. 6 to 9 show an example of various signal waveforms acquired from the source signal shown in FIG. 5. In FIGS. 6 to 9, the horizontal axis represents time and the vertical axis represents sample value. The sampling rate of the sensor 20 is 1 kHz.

Figure 6:
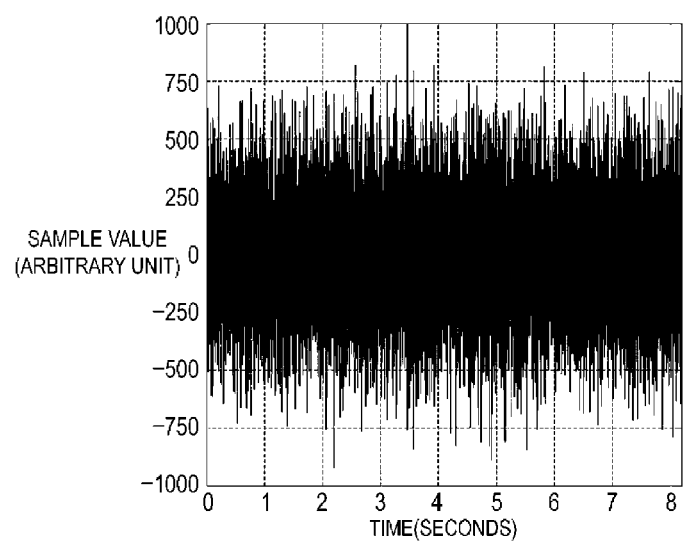
FIG. 6 shows an example of a signal of a first period sliced out of a source signal.
Figure 7:
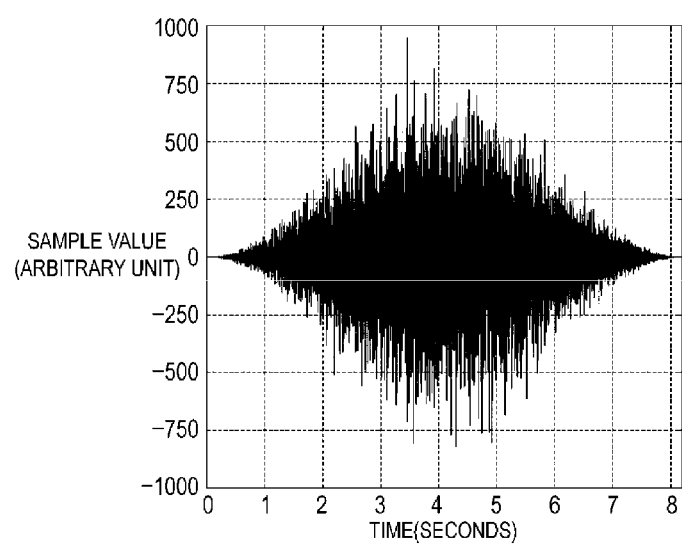
FIG. 7 shows an example of a template signal.

FIG. 6 shows an example of the signal of the first period sliced out of the source signal. FIG. 7 shows an example of the template signal generated by multiplying the signal of the first period shown in FIG. 6 by a Hanning window function. In the example shown in FIG. 7, the time length t1 of the template signal is 8.192 seconds. The template signal includes 8192 samples. The signal shown in FIG. 6 may also be used as the template signal.

Figure 8:
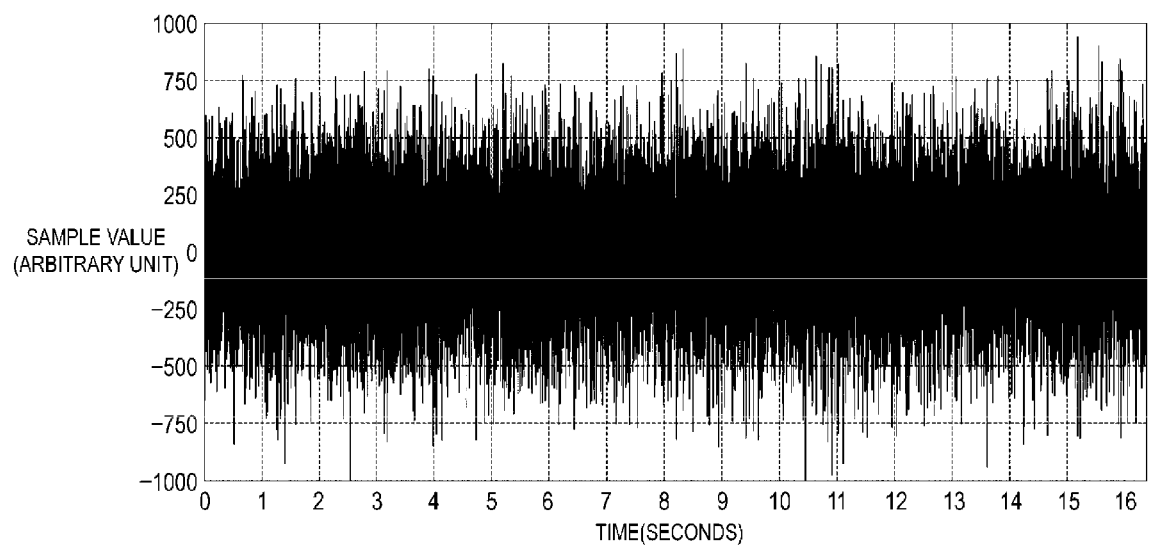
FIG. 8 shows an example of a waveform of a processing target signal.

FIG. 8 shows an example of the waveform of the processing target signal. The time length t2 of the processing target signal is 24.576 seconds (=16.384 seconds+8.192 seconds). The processing target signal includes 24576 samples. FIG. 8 shows a signal of the first 16.384 seconds sliced out of these samples.

Figure 9:
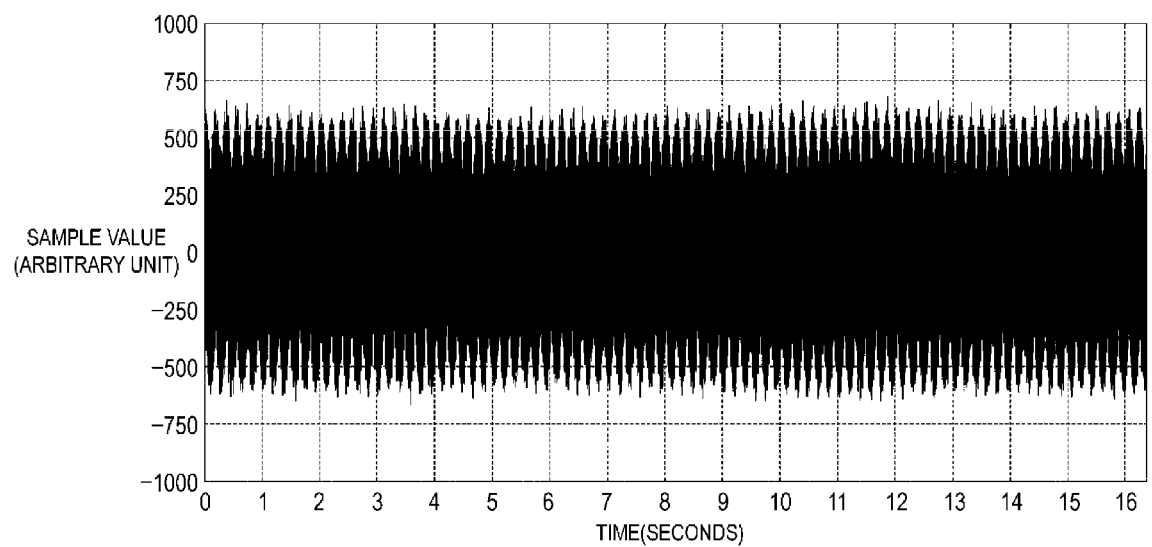
FIG. 9 shows an example of a waveform of a correlated signal.

FIG. 9 shows an example of the waveform of the correlated signal after the correlation filter processing between the template signal shown in FIG. 7 and the processing target signal shown in FIG. 8. In the example shown in FIG. 9, the time length of the correlated signal is 16.384 seconds, which is equal to the difference between the time length t2 of the processing target signal and the time length t1 of the template signal. The correlated signal includes 16384 samples.

Figure 10:
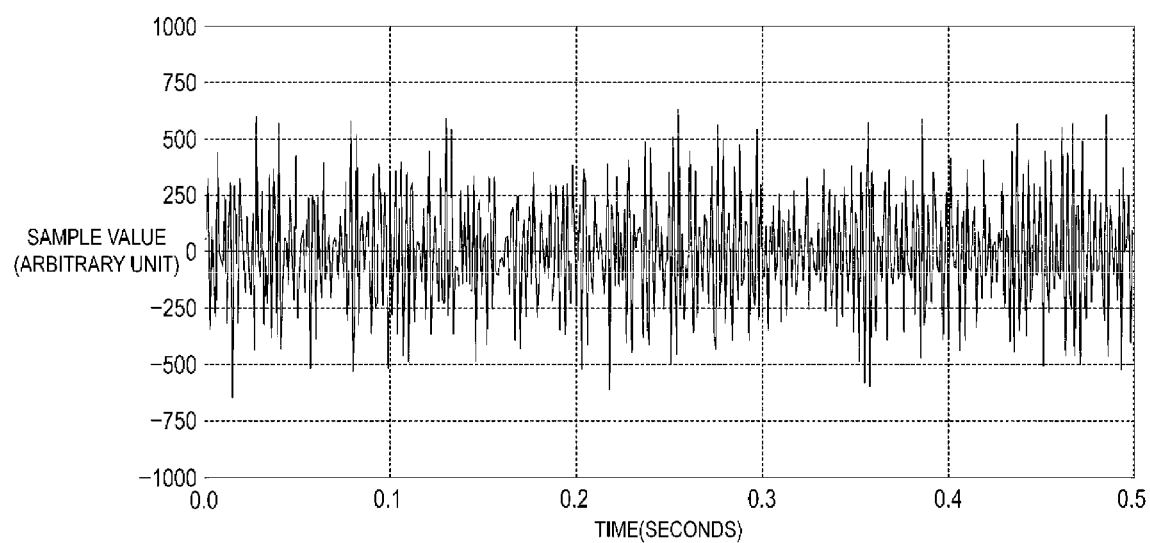
FIG. 10 is an enlarged view of the waveform of the processing target signal shown in FIG. 8.
Figure 11:
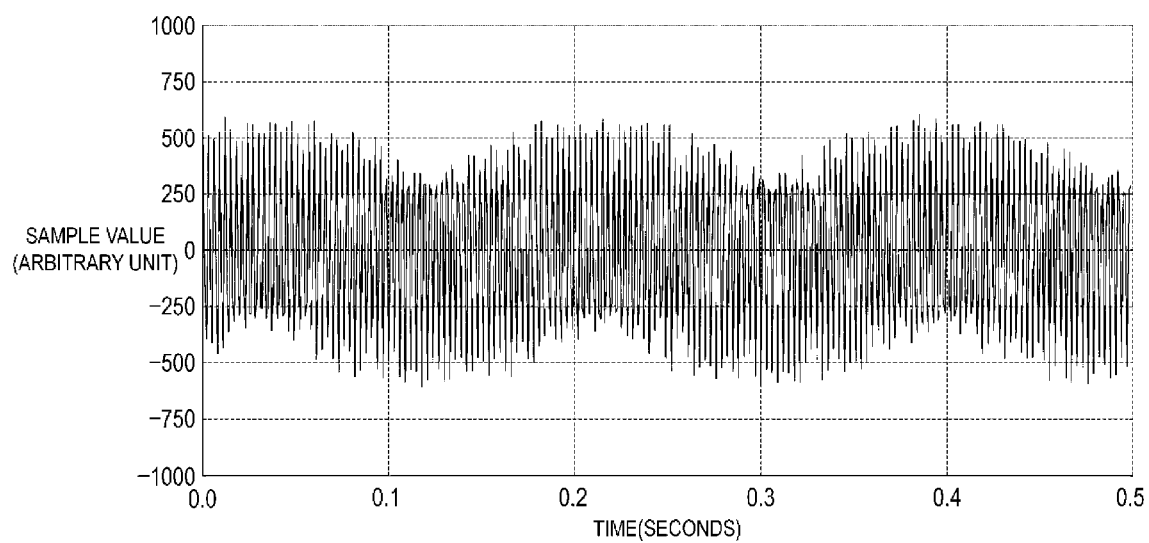
FIG. 11 is an enlarged view of the waveform of the correlated signal shown in FIG. 9.

FIG. 10 is an enlarged view of the waveform of the $0^{th}$ second to the $0.5^{th}$ second of the processing target signal shown in FIG. 8. FIG. 11 is an enlarged view of the waveform of the $0^{th}$ second to the $0.5^{th}$ second of the correlated signal shown in FIG. 9. Since the dry pump 200 is in the steady state, the source signal includes signal components with various frequencies due to the operations of the motor, the gear, the bearing, the rotor and the like built inside the booster pump 210 and the motor, the gear, the bearing, the rotor and the like built inside the main pump 220. The template signal shown in FIG. 7 and the processing target signal shown in FIG. 8 are both generated based on a signal sliced out of the source signal and therefore include signal components with various frequencies that are common to these two signals. A signal component with the same frequency included in the template signal and the processing target signal is amplified by the correlation filter processing. Meanwhile, of signal components that are not correlated with the operation of the dry pump 200, an ergodic noise is reduced by the correlation filter processing. Therefore, a signal component correlated with the operation of the dry pump 200 is unclear in the processing target signal shown in FIG. 10 but is clear in the correlated signal shown in FIG. 11.

1-2. Signal Processing Device

Figure 12:
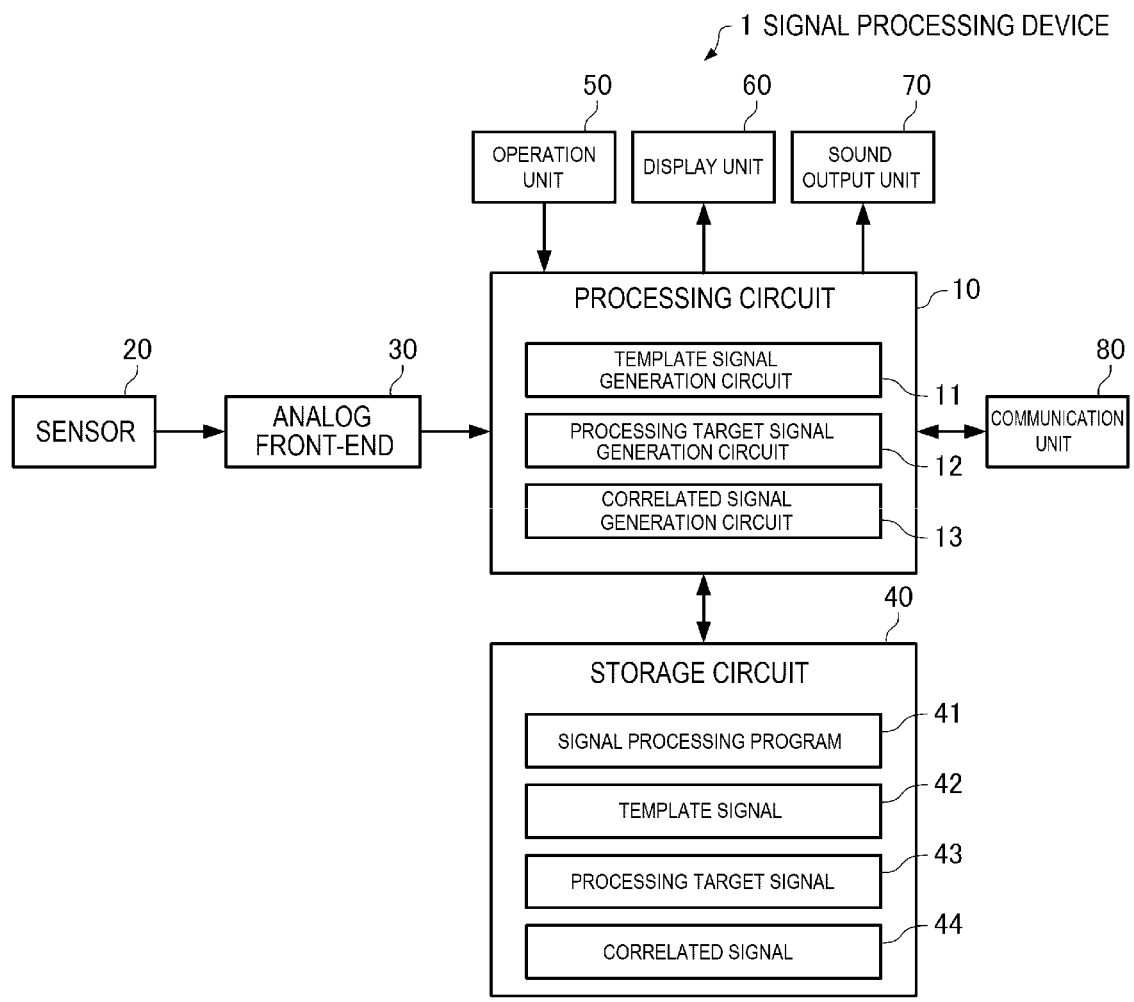
FIG. 12 shows an example of a configuration of a signal processing device according to the first embodiment.

FIG. 12 shows an example of the configuration of the signal processing device 1 implementing the foregoing signal processing method. As shown in FIG. 12, the signal processing device 1 includes a processing circuit 10, a sensor 20, an analog front-end 30, a storage circuit 40, an operation unit 50, a display unit 60, a sound output unit 70, and a communication unit 80. The signal processing device 1 may be configured by omitting or changing a part of the components shown in FIG. 12 except the processing circuit 10 and the sensor 20 or by adding another component.

The sensor 20 detects a physical quantity generated in a steady state of a target object and outputs a signal with a magnitude corresponding to the detected physical quantity. The output signal from the sensor 20 is inputted to the analog front-end 30.

The analog front-end 30 performs processing such as amplification and A/D conversion of the output signal from the sensor 20 and outputs a digital time-series signal.

The processing circuit 10 uses the digital time-series signal outputted from the analog front-end 30, as a source signal, and performs signal processing on the source signal. Specifically, the processing circuit 10 executes a signal processing program 41 stored in the storage circuit and performs various computational processing on the source signal. The processing circuit 10 also performs various kinds of processing corresponding to an operation signal from the operation unit 50, processing of transmitting a display signal for displaying various kinds of information on the display unit 60, processing of transmitting a sound signal for causing the sound output unit 70 to generate various sounds, processing of controlling the communication unit 80 to communicate data with an external device, and the like. The processing circuit 10 is implemented, for example, by a CPU (central processing unit) or a DSP (digital signal processor).

The processing circuit 10 executes the signal processing program 41 and thus functions as a template signal generation circuit 11, a processing target signal generation circuit 12, and a correlated signal generation circuit 13. That is, the signal processing device 1 includes the template signal generation circuit 11, the processing target signal generation circuit 12, and the correlated signal generation circuit 13.

The template signal generation circuit 11 generates a template signal 42 that is a time-series signal, based on the source signal that is a time-series signal corresponding to the physical quantity generated in the steady state of the target object. That is, the template signal generation circuit 11 executes the template signal generation step S1 shown in FIG. 1, specifically, the steps S11, S12 shown in FIG. 2. The template signal 42 generated by the template signal generation circuit 11 is stored in the storage circuit 40.

The processing target signal generation circuit 12 generates a processing target signal 43 that is a time-series signal, based on the source signal. That is, the processing target signal generation circuit 12 executes the processing target signal generation step S2 shown in FIG. 1, specifically, the steps S21, S22 shown in FIG. 3. The processing target signal 43 generated by the processing target signal generation circuit 12 is stored in the storage circuit 40.

The correlated signal generation circuit 13 performs correlation filter processing between the template signal 42 generated by the template signal generation circuit 11 and the processing target signal 43 generated by the processing target signal generation circuit 12 and generates a correlated signal 44 that is a time-series signal. That is, the correlated signal generation circuit 13 executes the correlated signal generation step S3 shown in FIG. 1, specifically, the steps S31 to S36 shown in FIG. 4. The correlated signal 44 generated by the correlated signal generation circuit 13 is stored in the storage circuit 40.

The storage circuit 40 has a ROM (read-only memory) and a RAM (random-access memory), not illustrated. The ROM stores various programs such as the signal processing program 41 and predetermined data. The RAM stores signals and data generated by the processing circuit 10 such as the template signal 42, the processing target signal 43, and the correlated signal 44. The RAM is also used as a work area for the processing circuit 10 and stores a program and data read out from the ROM, data inputted from the operation unit 50, and signals and data temporarily generated by the processing circuit 10.

The operation unit 50 is an input device formed of an operation key, a button switch or the like, and outputs an operation signal corresponding to an operation by a user, to the processing circuit 10.

The display unit 60 is a display device formed of an LCD (liquid crystal display) or the like, and displays various kinds of information based on a display signal outputted from the processing circuit 10. The display unit 60 may be provided with a touch panel that functions as the operation unit 50. For example, the display unit 60 may display a waveform image of the correlated signal 44, based on a display signal outputted from the processing circuit 10.

The sound output unit 70 is formed of a speaker or the like and generates various sounds based on a sound signal outputted from the processing circuit 10. For example, the sound output unit 70 may generate a sound indicating the start and end of signal processing, based on a sound signal outputted from the processing circuit 10.

The communication unit 80 performs various kinds of control to establish data communication between the processing circuit 10 and an external device. For example, the communication unit 80 may transmit the correlated signal 44 to the external device.

At least a part of the template signal generation circuit 11, the processing target signal generation circuit 12, and the correlated signal generation circuit 13 may be implemented by dedicated hardware. The signal processing device 1 may be a single device or may be formed of a plurality of devices. For example, the sensor 20 and the analog front-end 30 may be included in a first device, whereas the processing circuit 10, the storage circuit 40, the operation unit 50, the display unit 60, the sound output unit 70, and the communication unit 80 may be included in a second device that is separate from the first device. Also, for example, the processing circuit 10 and the storage circuit 40 may be implemented by a device such as a cloud server, and this device may generate the correlated signal and transmit the generated correlated signal 44 to a terminal including the operation unit 50, the display unit 60, the sound output unit 70, and the communication unit 80 via a communication network.

1-3. Advantageous Effects

According to the above-described first embodiment, both the template signal and the processing target signal generated based on the source signal include a periodic signal component correlated with a physical quantity generated in the steady state of the target object that is a target of signal processing. Therefore, by the correlation filter processing between the template signal and the processing target signal, the periodic signal components strengthen each other. The periodic signal component included in the processing target signal can be detected without performing envelope processing.

Of the signal components that are not correlated with the physical quantity, ergodic noises weaken each other. Therefore, an effect equivalent to that of synchronous averaging of a periodic signal component included in the template signal by the number of cycles is achieved. Even when the amplitude of the periodic signal component included in the processing target signal is small, a correlated signal having a high S/N ratio is acquired. Thus, according to the first embodiment, constraints on the place of installation of the target object and the physical quantity acquisition unit are reduced.

Also, according to the first embodiment, signal processing can be carried out when the target object is in the steady state. Therefore, a desired correlated signal can be acquired without changing the operation state of the target object.

2. Second Embodiment

A second embodiment will now be described mainly in terms of its difference from the first embodiment. Components similar to those in the first embodiment are denoted by the same reference signs. The same description as in the first embodiment is omitted or simplified.

The procedure of a signal processing method according to the second embodiment is the same as in FIG. 1 and therefore not illustrated here. In the signal processing method according to the second embodiment, the procedure of the template signal generation step S1 and the procedure of the processing target signal generation step S2 are different from those in the first embodiment, whereas the procedure of the correlated signal generation step S3 is the same as in the first embodiment.

Figure 13:
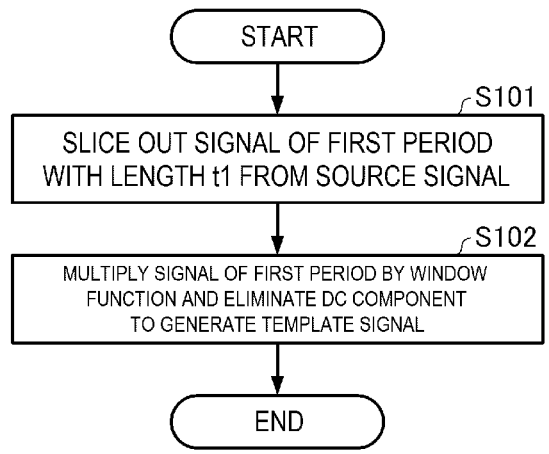
FIG. 13 is a flowchart showing an example of a procedure of a template signal generation step in a second embodiment.

FIG. 13 is a flowchart showing an example of the procedure of the template signal generation step S1 in the second embodiment.

As shown in FIG. 13, in the template signal generation step S1, the signal processing device 1 first slices out a signal of a first period with a length t1 from a source signal (step S101).

Next, the signal processing device 1 multiplies the signal of the first period by a window function, eliminates a DC component, and thus generates a template signal (step S102), and ends the template signal generation step S1. For example, the signal processing device 1 may perform highpass filter processing on the signal obtained by multiplying the signal of the first period by the window function and thus eliminate a DC component.

Figure 14:
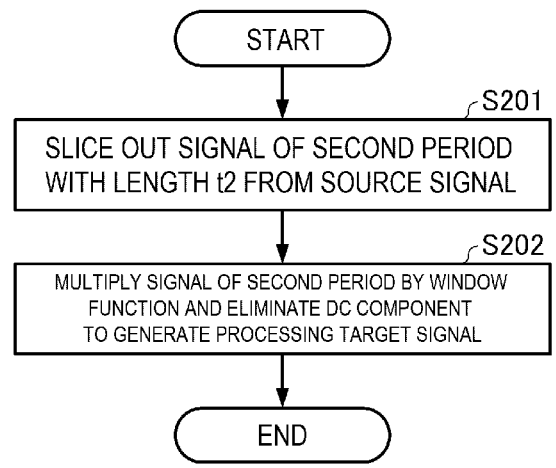
FIG. 14 is a flowchart showing an example of a procedure of a processing target signal generation step in the second embodiment.

FIG. 14 is a flowchart showing an example of the procedure of the processing target signal generation step S2 in the second embodiment.

As shown in FIG. 14, in the processing target signal generation step S2, the signal processing device 1 first slices out a signal of a second period with a length t2 that does not overlap the first period, from the source signal (step S201).

Next, the signal processing device 1 multiplies the signal of the second period by a window function, eliminates a DC component, and thus generates a processing target signal (step S202), and ends the processing target signal generation step S2.

The example of the configuration of the signal processing device 1 in the second embodiment is similar to the configuration shown in FIG. 12 and therefore is not illustrated. However, the template signal generation circuit 11 executes the steps S101, S102 shown in FIG. 13. The processing target signal generation circuit 12 executes the steps S201, S202 shown in FIG. 14. The other components and functions of the signal processing device 1 in the second embodiment are similar to those in the first embodiment and therefore are not described further in detail here.

In this way, according to the procedure shown in FIG. 13 and the procedure shown in FIG. 14, the template signal and the processing target signal are signals with the DC component eliminated. However, only one of the template signal and the processing target signal may be a signal with the DC component eliminated. That is, in this embodiment, at least one of the template signal and the processing target signal is a signal with the DC component eliminated. Therefore, while the correlated signal acquired by the correlation filter processing is biased by the amount of correlation of the DC component included in the template signal and the processing target signal, the bias is reduced and this reduces the maximum value of the correlated signal and the amount of data of the correlated signal. Thus, according to the second embodiment, the storage circuit 40 for storing the correlated signal can be reduced in size in the signal processing device 1.

3. Third Embodiment

A third embodiment will now be described mainly in terms of its difference from the first embodiment and the second embodiment. Components similar to those in the first embodiment or the second embodiment are denoted by the same reference signs. The same description as in the first embodiment or the second embodiment is omitted or simplified.

The procedure of a signal processing method according to the third embodiment is the same as in FIG. 1 and therefore not illustrated here. In the signal processing method according to the third embodiment, the procedure of the template signal generation step S1 and the procedure of the correlated signal generation step S3 are different from those in the first embodiment and the second embodiment, whereas the procedure of the processing target signal generation step S2 is the same as in the first embodiment or the second embodiment.

Figure 15:
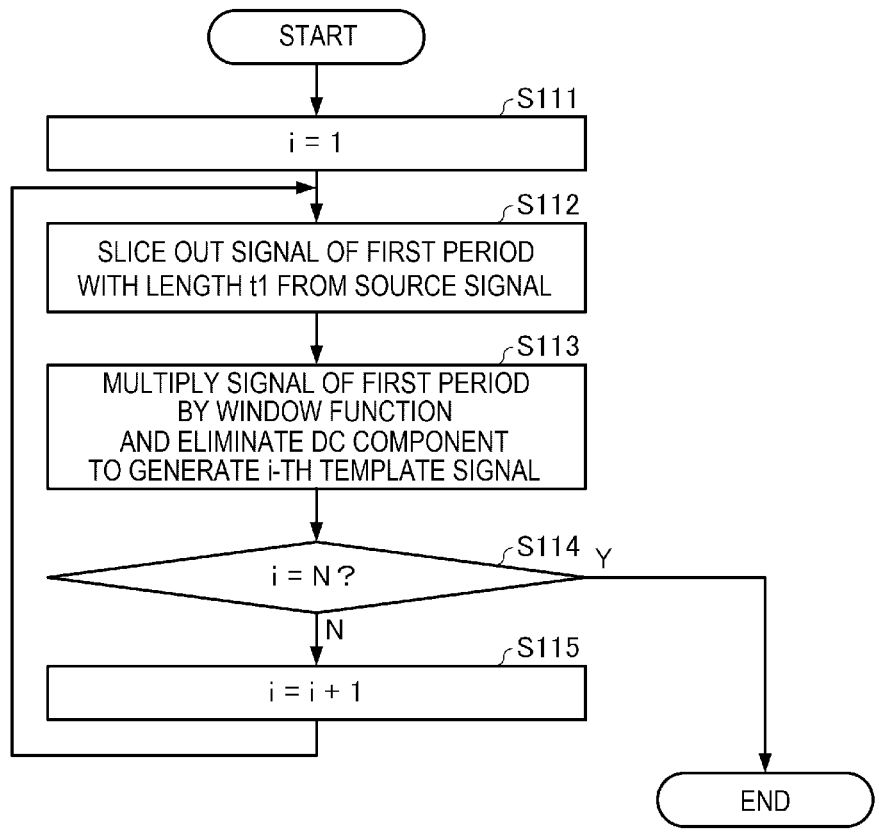
FIG. 15 is a flowchart showing an example of a procedure of a template signal generation step in a third embodiment.

FIG. 15 is a flowchart showing an example of the procedure of the template signal generation step S1 in the third embodiment.

As shown in FIG. 15, in the template signal generation step S1, the signal processing device 1 first sets an integer i=0 (step S111) and slices out a signal of a first period with a length t1 from a source signal (step S112).

Next, the signal processing device 1 multiplies the signal of the first period by a window function, eliminates a DC component, and thus generates an i-th template signal (step S113).

Next, the signal processing device 1 sets i=i+1 (step S115) and repeats the steps S112, S113 until i=N (N in step S114). When i=N (Y in step S114), the signal processing device 1 ends the template signal generation step S1.

In this way, in this embodiment, in the template signal generation step S1, the signal processing device 1 generates the first to N-th template signals based on the source signal.

Figure 16:
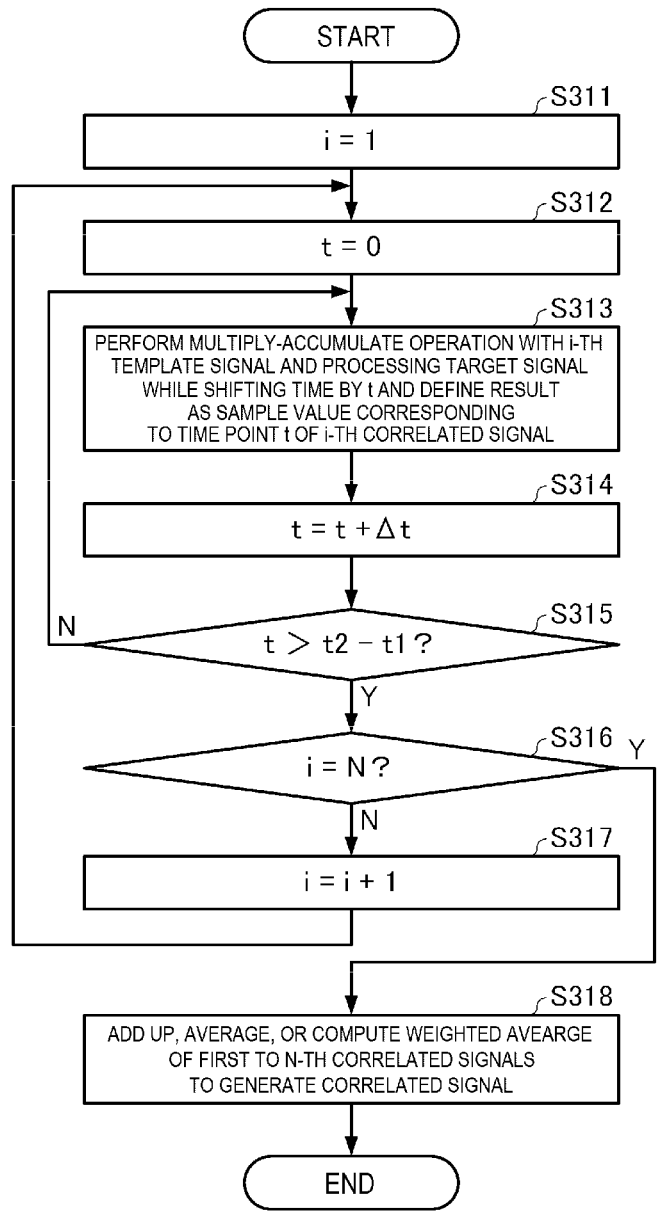
FIG. 16 is a flowchart showing an example of a procedure of a correlated signal generation step in the third embodiment.

FIG. 16 is a flowchart showing an example of the procedure of the correlated signal generation step S3 in the third embodiment.

As shown in FIG. 16, in the correlated signal generation step S3, the signal processing device 1 first sets an integer i=1 (step S311) and sets t=0 (step S312). The signal processing device 1 then performs a multiply-accumulate operation with the i-th template signal and the processing target signal while shifting the time by t and defines the result as a sample value corresponding to the time point t of the i-th correlated signal (step S313).

Next, the signal processing device 1 sets t=t+Δt (step S314) and repeats the steps S313, S314 until t>t2−t1 (N in step S315). When t>t2−t1 (Y in step S315) and not i=N (N in step S316), the signal processing device 1 sets i=i+1 (step S317) and performs the processing from step S312 onward again. N is a predetermined integer equal to or greater than 2.

The signal processing device 1 sets i=i+1 (step S317) and repeats the steps S312 to S315 until i=N (N in step S316). When i=N (Y in step S316), the signal processing device 1 adds up, averages, or computes a weighted average of the first to N-th correlated signals, thus generates a correlated signal (step S318), and ends the correlated signal generation step S3.

In this way, in this embodiment, in the correlated signal generation step S3, the signal processing device 1 performs correlation filter processing between each of the first to N-th template signals, each of which is a time-series signal generated based on the source signal, and the processing target signal, thus generates the first to N-th correlated signals, and adds up, averages or computes a weighted average of the first to N-th correlated signals to generate a correlated signal.

The example of the configuration of the signal processing device 1 in the third embodiment is similar to the configuration shown in FIG. 12 and therefore is not illustrated. However, the template signal generation circuit 11 executes the steps S111 to S115 shown in FIG. 15. The correlated signal generation circuit 13 executes the steps S311 to S318 shown in FIG. 16. The other components and functions of the signal processing device 1 in the third embodiment are similar to those in the first embodiment or the second embodiment and therefore are not described further in detail here.

According to the above-described third embodiment, the correlation filter processing reduces an ergodic noise included in the first to N-th correlated signals. Also, adding up, averaging or computing a weighted average of the first to N-th correlated signals further reduces the ergodic noise. Thus, a correlated signal having a higher S/N ratio is acquired.

4. Fourth Embodiment

A fourth embodiment will now be described mainly in terms of its difference from any of the first to third embodiments. Components similar to those in one of the first to third embodiments are denoted by the same reference signs. The same description as in one of the first to third embodiments is omitted or simplified.

Figure 17:
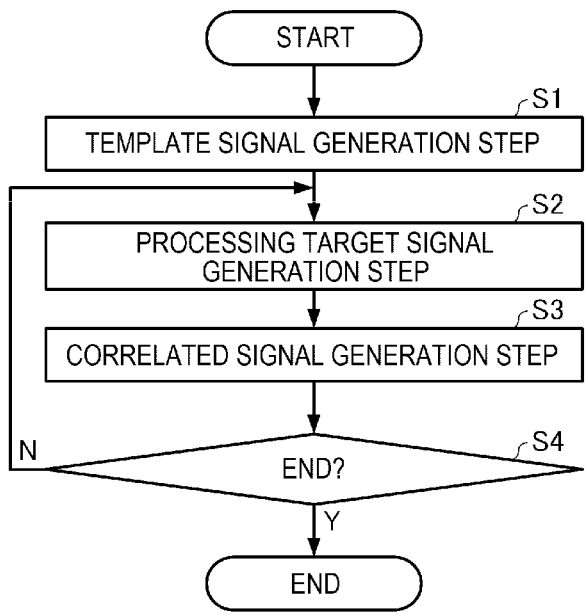
FIG. 17 is a flowchart showing a procedure of a signal processing method according to a fourth embodiment.

FIG. 17 is a flowchart showing the procedure of a signal processing method according to the fourth embodiment.

As shown in FIG. 17, the signal processing device 1 first executes the template signal generation step S1, the processing target signal generation step S2, and the correlated signal generation step S3, as in one of the first to third embodiments.

The signal processing device 1 repeats the steps S2, S3 until the signal processing ends (N in step S4).

In this way, in this embodiment, the processing target signal is updated until the signal processing ends, but the template signal is not updated.

In the signal processing method according to the fourth embodiment, the procedure of the template signal generation step S1, the procedure of the correlated signal generation step S3, and the procedure of the processing target signal generation step S2 are the same as in one of the first to third embodiments.

The signal processing device 1 may execute the processing target signal generation step S2, using a template signal that is generated in advance. That is, in this embodiment, the template signal generation step S1 may be omitted.

The example of the configuration of the signal processing device 1 in the fourth embodiment is similar to the configuration shown in FIG. 12 and therefore is not illustrated. However, the processing circuit 10 executes the steps S1 to S4 shown in FIG. 17. The other components and functions of the signal processing device 1 in the fourth embodiment are similar to those in one of the first to third embodiments and therefore are not described further in detail here.

According to the above-described fourth embodiment, the template signal is not updated. Therefore, when the cycle or intensity of a periodic signal component included in the processing target signal changes due to change with time of the target object, the intensity of the signal component included in the correlated signal changes. Thus, according to the fourth embodiment, the change with time of the target object and its cause or the like can be grasped more easily.

5. Fifth Embodiment

A fifth embodiment will now be described mainly in terms of its difference from any of the first to fourth embodiments. Components similar to those in one of the first to fourth embodiments are denoted by the same reference signs. The same description as in one of the first to fourth embodiments is omitted or simplified.

Figure 18:
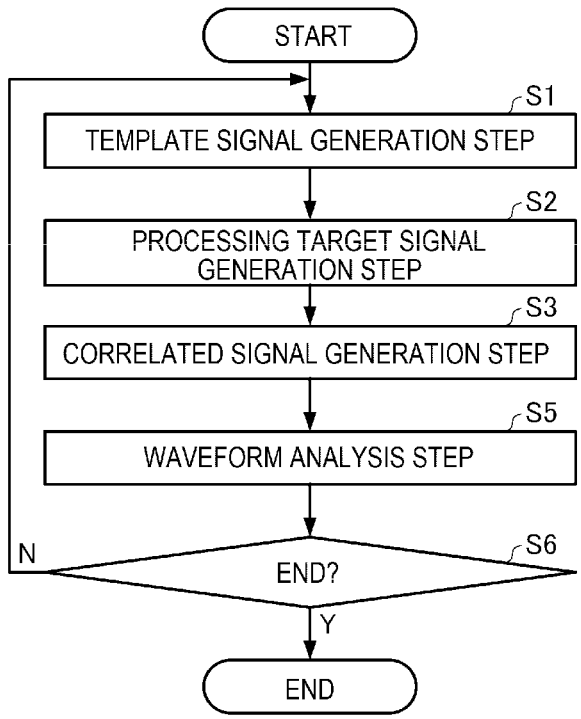
FIG. 18 is a flowchart showing a procedure of a signal processing method according to a fifth embodiment.

FIG. 18 is a flowchart showing a procedure of a signal processing method according to a fifth embodiment.

As shown in FIG. 18, the signal processing device 1 first executes the template signal generation step S1, the processing target signal generation step S2, and the correlated signal generation step S3, as in one of the first to third embodiments.

Next, the signal processing device 1 executes a waveform analysis step S5 of analyzing the waveform of the correlated signal.

The signal processing device 1 repeats the steps S1, S2, S3, S5 until the signal processing ends (N in step S6).

In the procedure shown in FIG. 18, the template signal and the processing target signal are updated until the signal processing ends.

Figure 19:
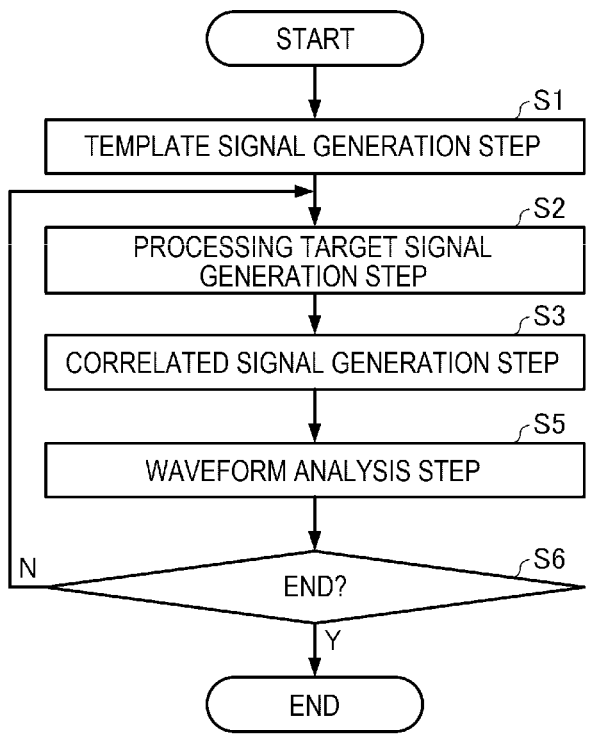
FIG. 19 is a flowchart showing another procedure of the signal processing method according to the fifth embodiment.

FIG. 19 is a flowchart showing another procedure of the signal processing method according to the fifth embodiment.

As shown in FIG. 19, the signal processing device 1 first executes the template signal generation step S1, the processing target signal generation step S2, and the correlated signal generation step S3, as in the fourth embodiment.

Next, the signal processing device 1 executes the waveform analysis step S5 of analyzing the waveform of the correlated signal.

The signal processing device 1 repeats the steps S2, S3, S5 until the signal processing ends (N in step S6).

In the procedure shown in FIG. 19, the processing target signal is updated until the signal processing ends, but the template signal is not updated.

As shown in FIGS. 18 and 19, in this embodiment, the signal processing device 1 executes the waveform analysis step S5 of analyzing the waveform of the correlated signal.

In the waveform analysis step S5, the signal processing device 1 may analyze the waveform, focusing on the frequency or cycle of a periodic signal included in the correlated signal.

Figure 20:
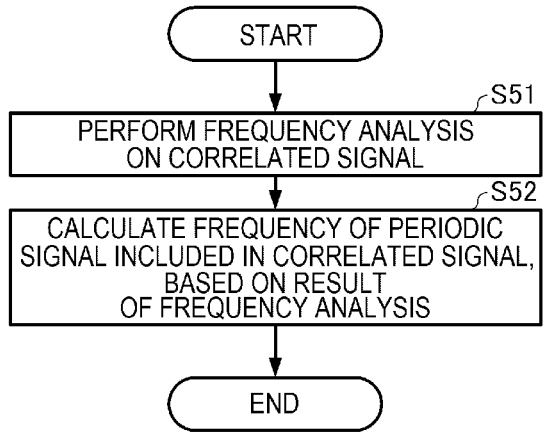
FIG. 20 is a flowchart showing an example of a procedure of a waveform analysis step in the fifth embodiment.

FIG. 20 is a flowchart showing an example of the procedure of the waveform analysis step S5 shown in FIG. 18 or FIG. 19.

As shown in FIG. 20, the signal processing device 1 first performs frequency analysis on the correlated signal (step S51). The frequency analysis may be, for example, fast Fourier transform (FFT), wavelet transform, self-correlation analysis or the like.

Next, the signal processing device 1 calculates the frequency and intensity of a periodic signal included in the correlated signal, based on the result of the frequency analysis in the step S51 (step S52), and ends the processing of the waveform analysis step S5.

In this way, in this embodiment, the signal processing device 1 performs frequency analysis on the correlated signal and calculates the frequency of a periodic signal included in the correlated signal, in the waveform analysis step S5.

Figure 21:
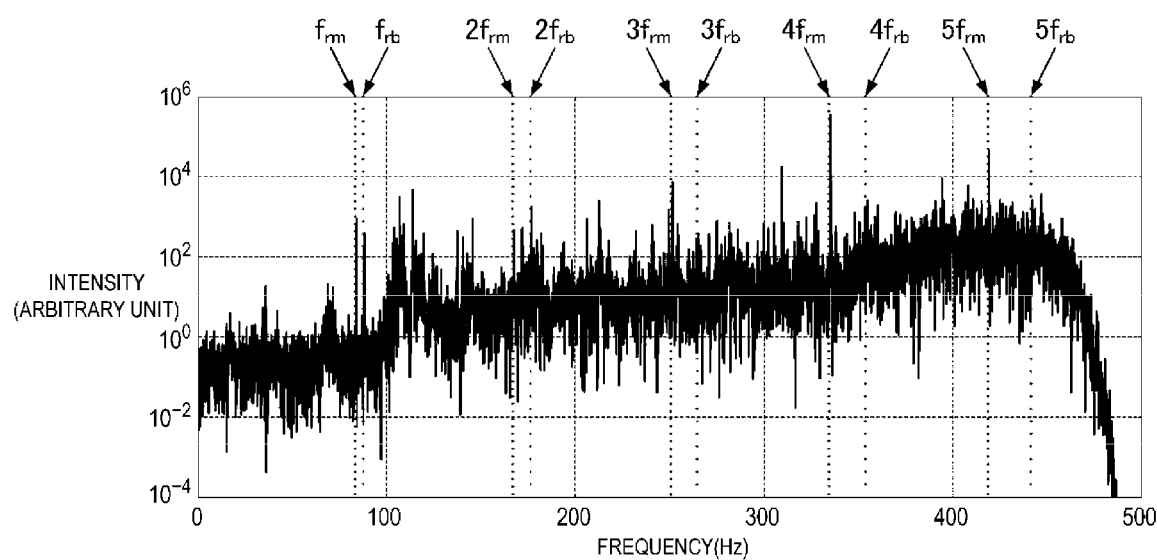
FIG. 21 shows an example of a frequency spectrum acquired by performing FFT on a correlated signal.
Figure 22:
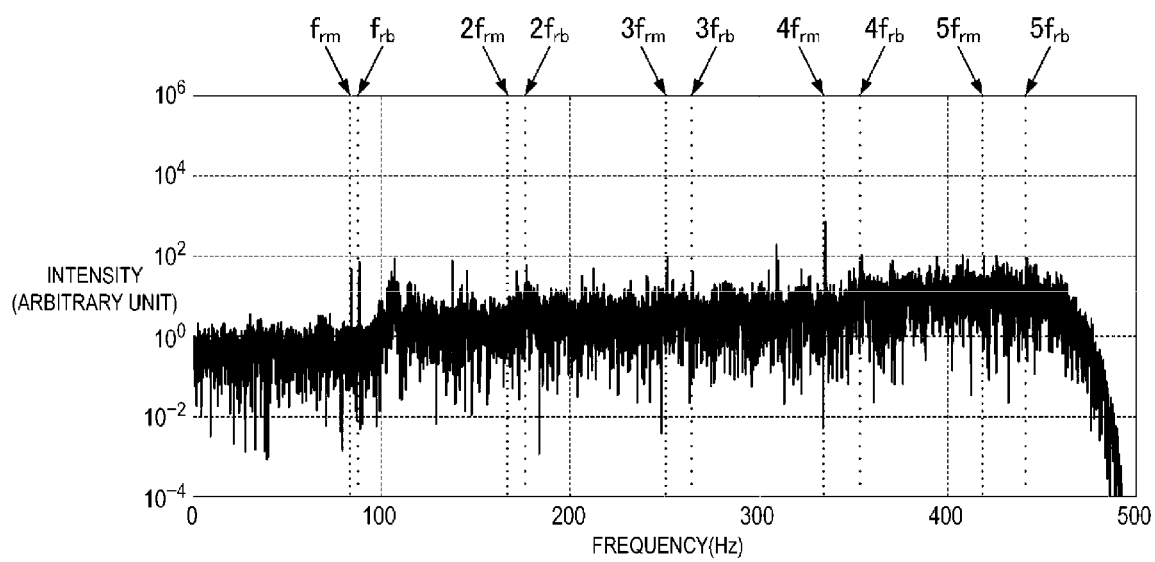
FIG. 22 shows an example of a frequency spectrum in a comparative example.

FIG. 21 shows an example of a frequency spectrum acquired by performing FFT on the correlated signal in the waveform analysis step S5, using a relatively new dry pump 200 which has operated for about several months, as a target object. FIG. 22 shows an example of a frequency spectrum acquired when FFT is performed directly on the processing target signal, as a comparative example. In FIGS. 21 and 22, the horizontal axis represents frequency and the vertical axis represents intensity.

It can be seen from the comparison between FIGS. and 22 that peaks of signal components with various frequencies are clearer in FIG. 21 than in FIG. 22 and that a correlated signal with a higher S/N ratio (signal-to-noise ratio) in which the noise is greatly reduced by performing correlation filter processing on the processing target signal is acquired in the example shown in FIG. 21. Therefore, the signal processing device 1 can calculate the frequency and intensity of various signal components, based on the frequency spectrum shown in FIG. 21.

For example, a design value of an inner race rotation frequency $f_{rm}$ is known, which is the frequency at which the inner race of the bearing in the main pump 220 rotates. In FIG. 21, a signal component whose intensity peaks near this design value is equivalent to a fundamental wave with the inner race rotation frequency $f_{rm}$. Similarly, a design value of an inner race rotation frequency $f_{rb}$ is known, which is the frequency at which the inner race of the bearing in the booster pump 210 rotates. In FIG. 21, a signal component whose intensity peaks near this design value is equivalent to a fundamental wave with the inner race rotation frequency $f_{rb}$. Therefore, the signal processing device 1 can calculate the intensity corresponding to each of the frequencies of the fundamental wave with the inner race rotation frequency $f_{rm}$ of the main pump 220 and its second to fifth harmonics and each of the frequencies of the fundamental wave with the inner race rotation frequency $f_{rb}$ of the booster pump 210 and its second to fifth harmonics, based on the frequency spectrum shown in FIG. 21.

The balance of the rotation and vibration of the bearing is understood, based on whether odd-order harmonics have a higher intensity or even-order harmonics have a higher intensity. It is understood that when the odd-order harmonics have a higher intensity, the rotation and vibration are symmetric, whereas when the even-order harmonics have a higher intensity, the rotation and vibration are asymmetric.

Since change in the symmetry of the rotation and vibration, that is, deterioration or the like of the bearing, can be determined based on the intensity and change with time of each harmonic, it is preferable to be able to detect many harmonics. For example, the fifth harmonic with the inner race rotation frequency $f_{rm}$ of the main pump 220 and the fifth harmonic with the inner race rotation frequency $f_{rb}$ of the booster pump 210 are unclear in FIG. 22 but are very clear in FIG. 21. Therefore, the signal processing device 1 can securely detect these fifth harmonics by performing correlation filter processing.

Figure 23:
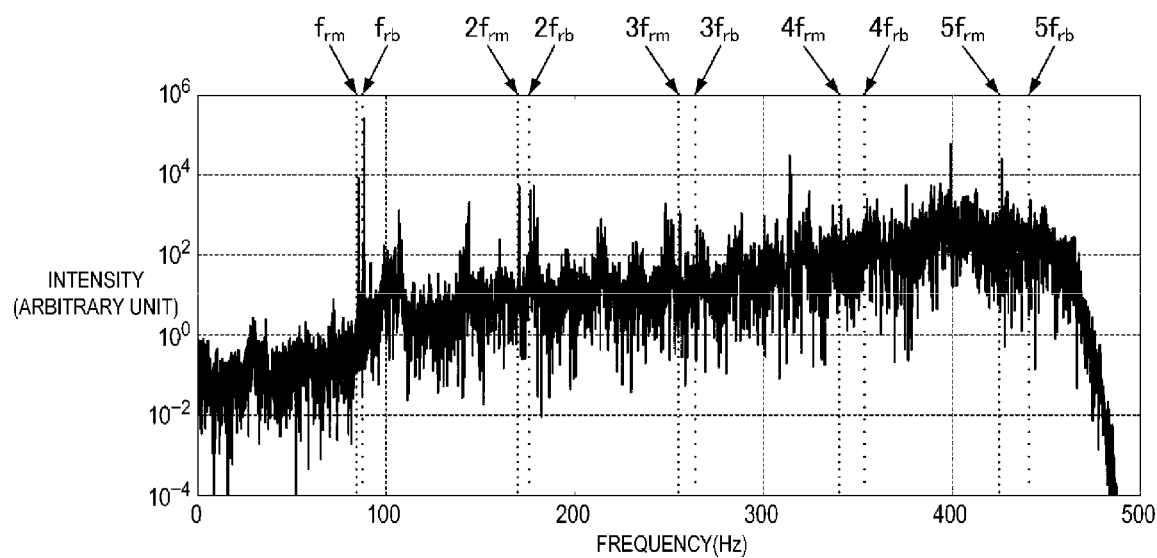
FIG. 23 shows another example of the frequency spectrum acquired by performing FFT on a correlated signal.
Figure 24:
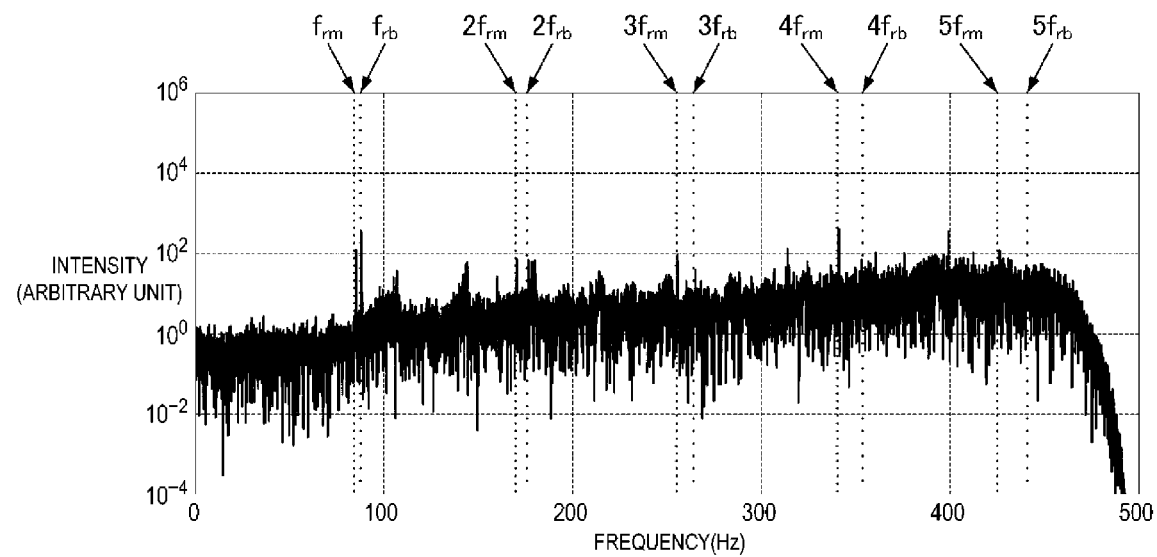
FIG. 24 shows another example of the frequency spectrum in a comparative example.

As another example, FIG. 23 shows an example of a frequency spectrum acquired by performing FFT on the correlated signal in the waveform analysis step S5, using a relatively old dry pump 200 which has operated for about ten years, as a target object. FIG. 24 shows an example of a frequency spectrum acquired when FFT is performed directly on the processing target signal, as a comparative example. In FIGS. 23 and 24, the horizontal axis represents frequency and the vertical axis represents intensity.

It can be seen from the comparison between FIGS. 23 and 24, for example, that the fifth harmonic with the inner race rotation frequency $f_{rm}$ of the main pump 220 and the fifth harmonic with the inner race rotation frequency $f_{rb}$ of the booster pump 210 are unclear in FIG. 24 but are very clear in FIG. 23. Therefore, the signal processing device 1 can securely detect these fifth harmonics by performing correlation filter processing.

Meanwhile, it can be seen from the comparison between FIGS. 21 and 23 that the intensities of the fundamental wave with the inner race rotation frequency $f_{rm}$ of the main pump 220 and its second to fifth harmonics and the intensities of the fundamental wave with the inner race rotation frequency $f_{rb}$ of the booster pump 210 and its second to fifth harmonics differ significantly between FIGS. 21 and 23. Also, the frequency of the fundamental wave with the inner race rotation frequency $f_{rm}$ of the main pump 220 differs slightly between FIGS. 21 and 23. This indicates that the main pump 220 and the booster pump 210 in the relatively old dry pump 200 are deteriorated due to change with time. In FIGS. 21 and 23, different dry pumps 200 are employed as the target object. However, the signal processing device 1 can periodically perform waveform analysis on one dry pump 200 and thus determine the deterioration with time of this dry pump 200.

Figure 25:
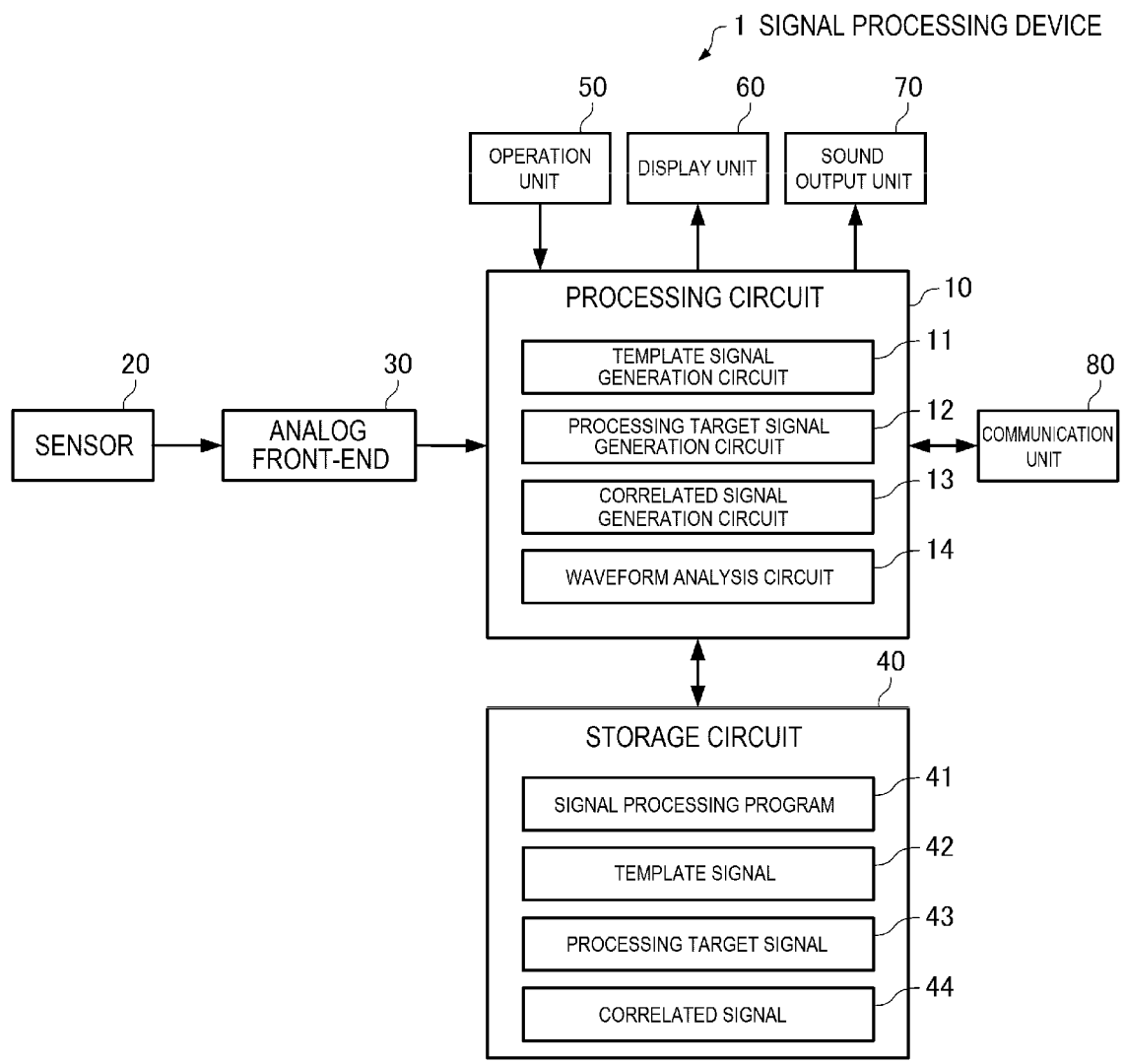
FIG. 25 shows an example of a configuration of a signal processing device according to the fifth embodiment.

FIG. 25 shows an example of the configuration of a signal processing device 1 implementing the signal processing method according to the fifth embodiment. As shown in FIG. 25, the signal processing device 1 includes the processing circuit 10, the sensor 20, the analog front-end 30, the storage circuit 40, the operation unit 50, the display unit 60, the sound output unit 70, and the communication unit 80. The signal processing device 1 may be configured by omitting or changing a part of the components shown in FIG. 25 or by adding another component.

The configurations and functions of the sensor 20, the analog front-end 30, the storage circuit 40, the operation unit 50, the display unit 60, the sound output unit 70, and the communication unit 80 are similar to those in one of the first to fourth embodiments and therefore are not described further in detail here.

The processing circuit 10 executes the signal processing program 41 and thus functions as the template signal generation circuit 11, the processing target signal generation circuit 12, the correlated signal generation circuit 13, and the waveform analysis circuit 14. That is, the signal processing device 1 includes the template signal generation circuit 11, the processing target signal generation circuit 12, the correlated signal generation circuit 13, and the waveform analysis circuit 14.

The functions of the template signal generation circuit 11, the processing target signal generation circuit 12, and the correlated signal generation circuit 13 are similar to those in one of the first to fourth embodiments and therefore are not described further in detail here.

The waveform analysis circuit 14 analyzes the waveform of the correlated signal 44 generated by the correlated signal generation circuit 13. The waveform analysis circuit 14 may analyze the waveform, focusing on the frequency or cycle of a periodic signal included in the correlated signal 44. In this embodiment, the waveform analysis circuit 14 analyzes the frequency of the correlated signal 44 and calculates the frequency and intensity of a periodic signal included in the correlated signal 44. That is, the waveform analysis circuit 14 executes the waveform analysis step S5 shown in FIG. 18 or FIG. 19, specifically, steps S51, S52 shown in FIG. 20.

The display unit 60 may display information about the result of the analysis by the waveform analysis circuit 14, based on a display signal outputted from the processing circuit 10. The sound output unit 70 may generate a sound indicating the start and end of the analysis by the waveform analysis circuit 14, based on a sound signal outputted from the processing circuit 10. The communication unit 80 may transmit information about the result of the analysis by the waveform analysis circuit 14, to an external device. The information about the result of the analysis by the waveform analysis circuit 14 is information such as the frequency of the periodic signal included in the correlated signal 44.

According to the above-described fifth embodiment, a correlated signal having a high S/N ratio is acquired as a result of correlation filter processing. Therefore, the waveform of the correlated signal can be accurately analyzed. Particularly, according to the fifth embodiment, the correlation filter processing highlights a periodic signal. Therefore, the waveform can be accurately analyzed in the frequency domain, based on the frequency spectrum of the correlated signal.

6. Sixth Embodiment

A sixth embodiment will now be described mainly in terms of its difference from any of the first to fifth embodiments. Components similar to those in one of the first to fifth embodiments are denoted by the same reference signs. The same description as in one of the first to fifth embodiments is omitted or simplified.

The procedure of a signal processing method according to the sixth embodiment is the same as in FIG. 18 or FIG. 19 and therefore not illustrated here. In the signal processing method according to the sixth embodiment, the procedure of the template signal generation step S1, the procedure of the processing target signal generation step S2, and the procedure of the correlated signal generation step S3 are the same as in one of the first to fifth embodiments.

In the sixth embodiment, as in the fifth embodiment, the signal processing device 1 executes the waveform analysis step S5 of analyzing the waveform of the correlated signal. In the waveform analysis step S5, the signal processing device 1 may analyze the waveform, focusing on the frequency or cycle of a periodic signal included in the correlated signal. However, in the sixth embodiment, the procedure of the waveform analysis step S5 is different from that in the fifth embodiment.

Figure 26:
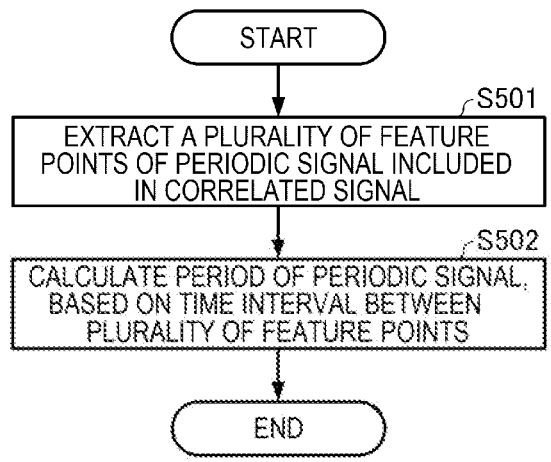
FIG. 26 is a flowchart showing an example of a procedure of a waveform analysis step in a sixth embodiment.

FIG. 26 is a flowchart showing an example of the procedure of the waveform analysis step S5 in the sixth embodiment.

As shown in FIG. 26, the signal processing device 1 first extracts a plurality of feature points of a periodic signal included in the correlated signal (step S501). The feature point may be a maximum point, a minimum point, an inflection point, a zero cross point and the like.

Next, the signal processing device 1 calculates the cycle of the periodic signal included in the correlated signal, based on the time interval between the plurality of feature points extracted in the step S501 (step S502), and ends the processing of the waveform analysis step S5.

In this way, in this embodiment, the signal processing device 1 calculates the cycle of a periodic signal included in the correlated signal, based on the time interval between a plurality of feature points of the periodic signal, in the waveform analysis step S5.

Figure 27:
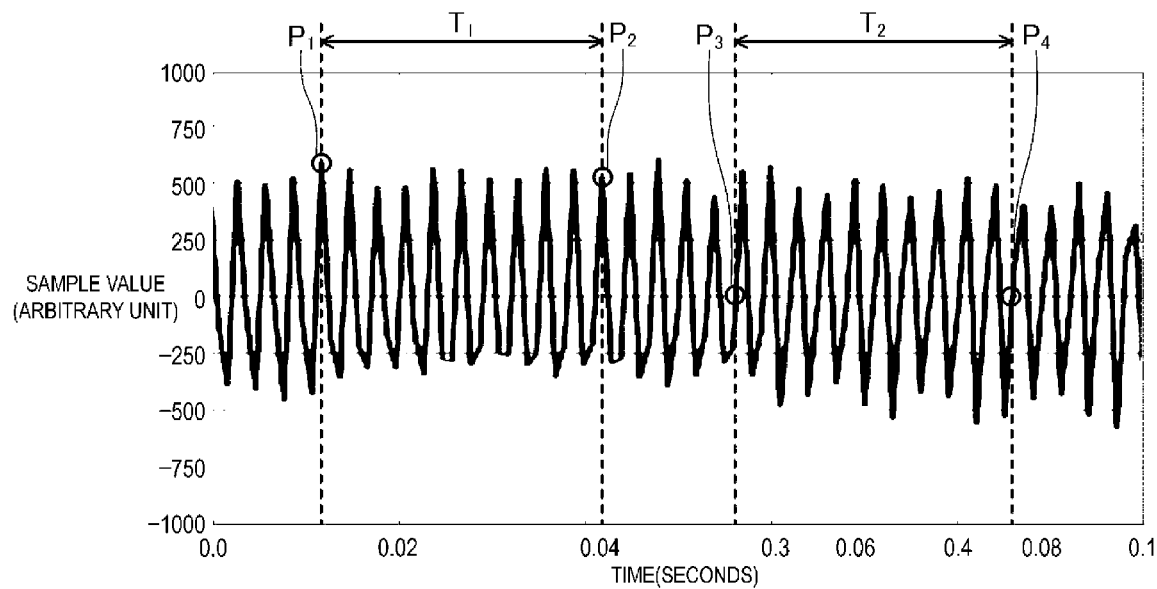
FIG. 27 is an enlarged view of the waveform of the correlated signal shown in FIG. 11.

FIG. 27 is an enlarged view of the waveform of the $0^{th}$ second to the $0.1^{st}$ second of the correlated signal shown in FIG. 11. For example, in the waveform analysis step S5, the signal processing device 1 may calculate a time interval $T_1$ between two maximum points P1, P2 spaced apart by 10 cycles of a main signal component included in the correlated signal and thus calculate a-series cycle $T=T_1^x 1/10$ of the main signal component. The signal processing device 1 may also calculate a time interval T2 between two zero cross points P3, P4 spaced apart by 10 cycles of the main signal component included in the correlated signal and thus calculate a cycle $T=T_2^x 1/10$ of the main signal component. The signal processing device 1 may also calculate a frequency $f=1/T$ of the main signal component. For example, the signal processing device 1 may compare the frequency f of the main signal component with a design value and thus determine the deterioration of the dry pump 200.

The example of the configuration of the signal processing device 1 in the sixth embodiment is similar to the configuration shown in FIG. 25 and therefore is not illustrated. However, the waveform analysis circuit 14 executes the steps S501, S502 shown in FIG. 26. The other components and functions of the signal processing device 1 in the sixth embodiments are similar to those in one of the first to fifth embodiments and therefore are not described further in detail here.

According to the above-described sixth embodiment, a correlated signal having a high S/N ratio is acquired as a result of correlation filter processing. Therefore, the waveform of the correlated signal can be accurately analyzed. Particularly, according to the sixth embodiment, the correlation filter processing highlights a periodic signal. Therefore, the waveform can be accurately analyzed in the time domain.

7. Seventh Embodiment

A seventh embodiment will now be described mainly in terms of its difference from any of the first to sixth embodiments. Components similar to those in one of the first to sixth embodiments are denoted by the same reference signs. The same description as in one of the first to sixth embodiments is omitted or simplified.

Figure 28:
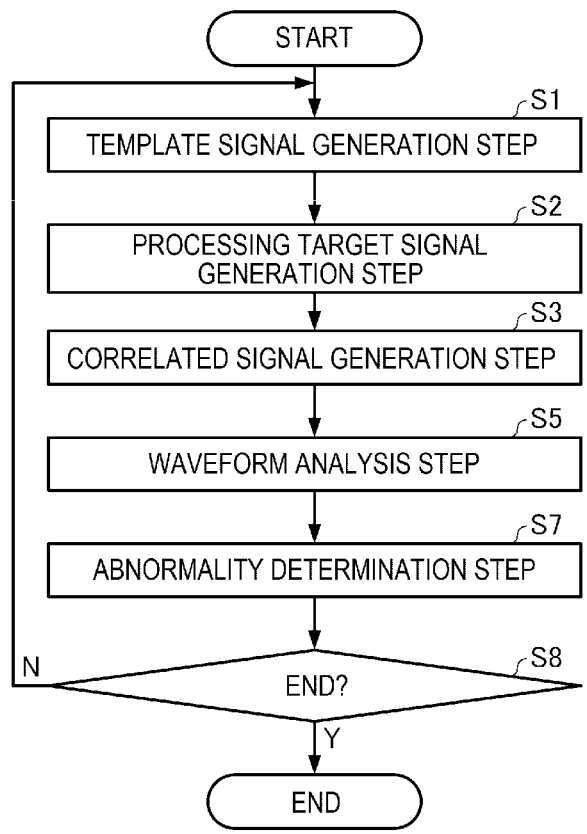
FIG. 28 is a flowchart showing a procedure of a signal processing method according to a seventh embodiment.

FIG. 28 is a flowchart showing a procedure of a signal processing method according to the seventh embodiment.

As shown in FIG. 28, the signal processing device 1 first executes the template signal generation step S1, the processing target signal generation step S2, and the correlated signal generation step S3, as in one of the first to sixth embodiments.

Next, the signal processing device 1 executes the waveform analysis step S5 of analyzing the waveform of the correlated signal, as in the fifth or sixth embodiment.

Next, the signal processing device 1 executes an abnormality determination step S7 of determining whether the target object has an abnormality or not, based on the result of the analysis in the waveform analysis step S5.

The signal processing device 1 repeats the steps S1, S2, S3, S5, S7 until the signal processing ends (N in step S8).

In the procedure shown in FIG. 28, the template signal and the processing target signal are updated until the signal processing ends.

Figure 29:
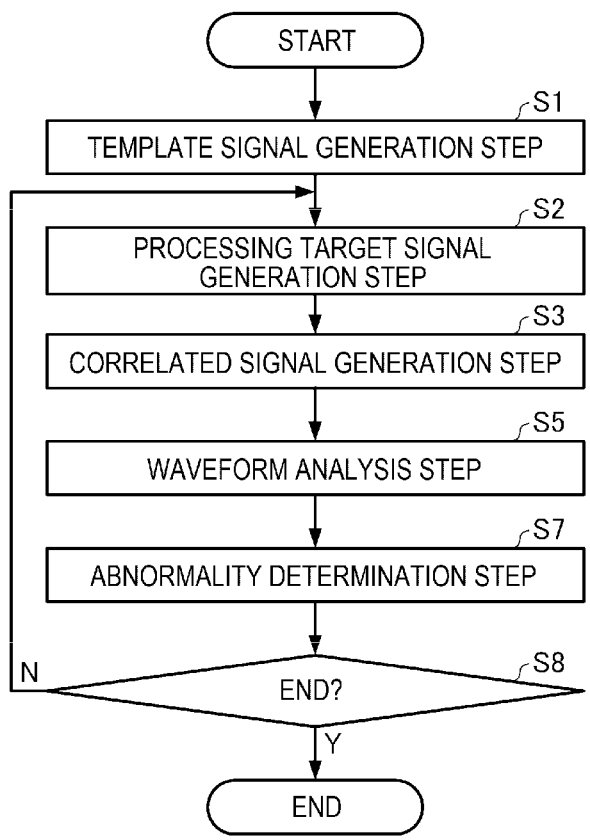
FIG. 29 is a flowchart showing another procedure of the signal processing method according to the seventh embodiment.

FIG. 29 is a flowchart showing another procedure of the signal processing method according to the seventh embodiment.

As shown in FIG. 29, the signal processing device 1 first executes the template signal generation step S1, the processing target signal generation step S2, and the correlated signal generation step S3, as in one of the first to sixth embodiments.

Next, the signal processing device 1 executes the waveform analysis step S5 of analyzing the waveform of the correlated signal, as in the fifth or sixth embodiment.

Next, the signal processing device 1 executes the abnormality determination step S7 of determining whether the target object has an abnormality or not, based on the result of the analysis in the waveform analysis step S5.

The signal processing device 1 repeats the steps S2, S3, S5, S7 until the signal processing ends (N in step S8).

In the procedure shown in FIG. 29, the processing target signal is updated until the signal processing ends, but the template signal is not updated.

As shown in FIGS. 28 and 29, in this embodiment, the signal processing device 1 executes the abnormality determination step S7 of determining whether the target object has an abnormality or not, based on the result of the analysis in the waveform analysis step S5. In the abnormality determination step S7, for example, the signal processing device 1 may determine that the target object is normal when the cycle or frequency of the periodic signal included in the correlated signal calculated in the waveform analysis step S5 is included in a predetermined range, and may determine that the target object is abnormal when the cycle or frequency is not included in the predetermined range. Alternatively, the signal processing device 1 may determine that the target object is normal when the amount of change in the cycle or frequency from the initial operation of the target object is included in a predetermined range, and may determine that the target object is abnormal when the amount of change is not included in the predetermined range.

FIG. 30 shows an example of the configuration of the signal processing device 1 implementing the signal processing method according to the seventh embodiment. As shown in FIG. 30, the signal processing device 1 includes the processing circuit 10, the sensor 20, the analog front-end 30, the storage circuit 40, the operation unit 50, the display unit 60, the sound output unit 70, and the communication unit 80. The signal processing device 1 may be configured by omitting or changing a part of the components shown in FIG. 30 or by adding another component.

The configurations and functions of the sensor 20, the analog front-end 30, the storage circuit 40, the operation unit 50, the display unit 60, the sound output unit 70, and the communication unit 80 are similar to those in one of the first to sixth embodiments and therefore are not described further in detail here.

The processing circuit 10 executes the signal processing program 41 and thus functions as the template signal generation circuit 11, the processing target signal generation circuit 12, the correlated signal generation circuit 13, the waveform analysis circuit 14, and an abnormality determination circuit 15. That is, the signal processing device 1 includes the template signal generation circuit 11, the processing target signal generation circuit 12, the correlated signal generation circuit 13, the waveform analysis circuit 14, and the abnormality determination circuit 15.

The functions of the template signal generation circuit 11, the processing target signal generation circuit 12, and the correlated signal generation circuit 13 are similar to those in one of the first to fourth embodiments and therefore are not described further in detail here. The functions of the waveform analysis circuit 14 are similar to those in the fifth or sixth embodiment and therefore are not described further in detail here.

The abnormality determination circuit 15 determines whether the target object has an abnormality or not, based on the result of the analysis by the waveform analysis circuit 14. For example, the abnormality determination circuit 15 may determine that the target object is normal when the cycle or frequency of the periodic signal included in the correlated signal 44 calculated by the waveform analysis circuit 14 is included in a predetermined range, and may determine that the target object is abnormal when the cycle or frequency is not included in the predetermined range. Alternatively, the abnormality determination circuit 15 may determine that the target object is normal when the amount of change in the cycle or frequency from the initial operation of the target object is included in a predetermined range, and may determine that the target object is abnormal when the amount of change is not included in the predetermined range. That is, the abnormality determination circuit 15 executes the abnormality determination step S7 shown in FIG. 28 or FIG. 29.

The display unit 60 may display information about the result of the determination by the abnormality determination circuit 15, based on a display signal outputted from the processing circuit 10. The sound output unit 70 may generate a sound indicating the result of the determination by the abnormality determination circuit 15, based on a sound signal outputted from the processing circuit 10. The communication unit 80 may transmit information about the result of the determination by the abnormality determination circuit 15, to an external device.

According to the above-described seventh embodiment, a correlated signal having a high S/N ratio is acquired as a result of correlation filter processing. Therefore, the waveform of the correlated signal can be accurately analyzed. Based on the result of the accurate analysis of the waveform of the correlated signal, whether the target object has an abnormality or not can be determined accurately.

8. Modification Examples

In the above embodiments, the template signal is a signal acquired by multiplying a signal sliced out of a source signal by a window function. However, the template signal may be the signal sliced out of the source signal.

In the first embodiment and the third to seventh embodiments, the frequency of update of the template signal and the frequency of update of the processing target signal are the same. However, these frequencies of update may be different from each other. The frequency of update of the template signal may be lower than the frequency of update of the processing target signal. For example, the frequency of update of the template signal may be 1/M of the frequency of update of the processing target signal, where M is an integer equal to or greater than 2.

In the first embodiment and the third to seventh embodiment, the signal processing device 1 generates the template signal. However, a different device from the signal processing device 1 may generate a template signal and write the template signal into the storage circuit 40 of the signal processing device 1.

The foregoing embodiments and modification examples are simply examples. The present disclosure is not limited to these embodiments and modification examples. For example, the embodiments and modification examples can be suitably combined together.

The present disclosure includes a configuration that is substantially the same as any of the configurations described in the embodiments (for example, a configuration having the same function, method, and result, or a configuration having the same objective and effect). The present disclosure also includes a configuration acquired by replacing a non-essential part of any of the configurations described in the embodiment. The present disclosure also includes a configuration achieving the same advantageous effect as any of the configurations described in the embodiments or a configuration that can achieve the same objective. The present disclosure also includes a configuration acquired by adding a known technique to any of the configurations described in the embodiments.

The following contents are derived from the foregoing embodiments and modification example.

According to one aspect, a signal processing method includes: a processing target signal generation step of generating a processing target signal that is a time-series signal, based on a source signal that is a time-series signal corresponding to a physical quantity generated in a steady state of a target object; and a correlated signal generation step of performing correlation filter processing between a template signal that is a time-series signal generated based on the source signal, and the processing target signal, and generating a correlated signal that is a time-series signal.

In this signal processing method, both the template signal and the processing target signal generated based on the source signal include a periodic signal component correlated with a physical quantity generated in the steady state of the target object that is a target of signal processing. Therefore, by the correlation filter processing between the template signal and the processing target signal, the periodic signal components strengthen each other. The periodic signal component included in the processing target signal can be detected without performing envelope processing.

Of the signal components that are not correlated with the physical quantity, ergodic noises weaken each other. Therefore, an effect equivalent to that of synchronous averaging of a periodic signal component included in the template signal by the number of cycles is achieved. Even when the amplitude of the periodic signal component included in the processing target signal is small, a correlated signal having a high S/N ratio is acquired. Thus, this signal processing method reduces constraints on the place of installation of the target object and the physical quantity acquisition unit.

Also, according to this signal processing method, signal processing can be carried out when the target object is in the steady state. Therefore, a desired correlated signal can be acquired without changing the operation state of the target object.

In the signal processing method according to the one aspect, the source signal may include a plurality of signal components that are cyclic. The plurality of signal components may have different cycles from each other.

According to this signal processing method, the target object can have a plurality of mechanisms having different clock frequencies from each other.

In the signal processing method according to the one aspect, the template signal may be longer than a cycle of a first signal component of the plurality of signal components and shorter than the processing target signal. A difference in length between the processing target signal and the template signal may be longer than the cycle of the first signal component.

According to this signal processing method, the correlated signal includes the first signal component over one or more cycles. Therefore, the first signal component can be regarded as an analysis target.

In the signal processing method according to the one aspect, the template signal may be a signal acquired by multiplying a signal sliced out of the source signal by a window function.

According to this signal processing method, the influence of a noise on the correlated signal due to discontinuity of the first sample value and the last sample value of the template signal can be reduced.

The signal processing method according to the one aspect may include a template signal generation step of generating the template signal, based on the source signal.

In the signal processing method according to the one aspect, the template signal may be updated.

According to this signal processing method, even when the cycle of a periodic signal component included in the processing target signal changes due to change with time of the target object, a correlated signal including this signal component can be generated. As the interval of update of the template signal becomes shorter, the intensity of this signal component included in the correlated signal can be increased.

In the signal processing method according to the one aspect, the template signal may be not updated.

According to this signal processing method, when the cycle or intensity of a periodic signal component included in the processing target signal changes due to change with time of the target object, the tensity of the signal component included in the correlated signal changes. Therefore, the change with time of the target object, its cause or the like can be grasped more easily.

In the signal processing method according to the one aspect, the template signal may be a signal based on a signal of a first period sliced out of the source signal. The processing target signal may be a signal based on a signal of a second period that is sliced out of the source signal and does not overlap the first period.

According to this signal processing method, there is no period in which the template signal and the processing target signal include completely the same signal. Therefore, an ergodic signal component such as a noise can be effectively reduced by the correlation filter processing.

In the signal processing method according to the one aspect, the template signal and the processing target signal may have a same sampling period.

According to this signal processing method, in the correlation filter processing, the orthogonality of each of signal components having different frequencies is maintained, and signal components having the same frequency are properly extracted.

In the signal processing method according to the one aspect, at least one of the template signal and the processing target signal may be a signal with a DC component eliminated.

In this signal processing method, while the correlated signal acquired by the correlation filter processing is biased by the amount of correlation of the DC component included in the template signal and the processing target signal, the bias is reduced and this reduces the maximum value of the correlated signal and the amount of data of the correlated signal. Thus, according to this signal processing method, the memory for holding the correlated signal can be reduced in size.

In the signal processing method according to the one aspect, the correlation filter processing may be a multiply-accumulate operation with the template signal and the processing target signal. An envelope of the correlated signal and an envelope of the processing target signal may be nonlinear.

According to this signal processing method, there is no constraint on maintaining the linearity of the envelope before and after the correlation filter processing. Therefore, an ergodic noise included in the processing target signal is efficiently reduced.

In the signal processing method according to the one aspect, the multiply-accumulate operation may be FIR filter processing on the processing target signal. A coefficient of the FIR filter processing may be defined based on the template signal.

According to this signal processing method, the correlation filter processing can be implemented easily.

In the signal processing method according to the one aspect, the correlated signal generation step may include setting a first template signal as the template signal, performing correlation filter processing between each of first to N-th template signals each of which is a time-series signal generated based on the source signal, and the processing target signal, to generate first to N-th correlated signals, and adding up, averaging, or computing a weighted average of the first to N-th correlated signals to generate the correlated signal, N being an integer equal to or greater than 2.

According to this signal processing method, the correlation filter processing reduces an ergodic noise included in the first to N-th correlated signals. Also, adding up, averaging or computing a weighted average of the first to N-th correlated signals further reduces the ergodic noise. Thus, a correlated signal having a higher S/N ratio is acquired.

The signal processing method according to the one aspect may include a waveform analysis step of analyzing a waveform of the correlated signal.

According to this signal processing method, a correlated signal having a high S/N ratio is acquired as a result of correlation filter processing. Therefore, the waveform of the correlated signal can be accurately analyzed.

In the signal processing method according to the one aspect, the waveform analysis step may include analyzing the waveform, focusing on a frequency or cycle of a periodic signal included in the correlated signal.

According to this signal processing method, the correlation filter processing highlights a periodic signal. Therefore, the waveform can be accurately analyzed, focusing on the cycle or frequency of the periodic signal.

In the signal processing method according to the one aspect, the waveform analysis step may include performing frequency analysis of the correlated signal to calculate the frequency.

According to this signal processing method, the waveform can be accurately analyzed in the frequency domain.

In the signal processing method according to the one aspect, the waveform analysis step may include calculating the cycle, based on a time interval between a plurality of feature points of the periodic signal.

According to this signal processing method, the waveform can be accurately analyzed in the time domain.

The signal processing method according to the one aspect may include an abnormality determination step of determining whether the target object has an abnormality or not, based on a result of analysis in the waveform analysis step.

According to this signal processing method, whether the target object has an abnormality or not can be determined accurately, based on the result of the accurate analysis of the waveform of the correlated signal.

According to another aspect, a signal processing device includes: a processing target signal generation circuit generating a processing target signal that is a time-series signal, based on a source signal that is a time-series signal corresponding to a physical quantity generated in a steady state of a target object; a storage circuit storing a template signal that is a time-series signal generated based on the source signal; and a correlated signal generation circuit performing correlation filter processing between the template signal and the processing target signal and generating a correlated signal that is a time-series signal.

In this signal processing device, both the template signal and the processing target signal generated based on the source signal include a periodic signal component correlated with a physical quantity generated in the steady state of the target object that is a target of signal processing. Therefore, by the correlation filter processing between the template signal and the processing target signal, the periodic signal components strengthen each other. The periodic signal component included in the processing target signal can be detected without performing envelope processing.

Of the signal components that are not correlated with the physical quantity, ergodic noises weaken each other. Therefore, an effect equivalent to that of synchronous averaging of a periodic signal component included in the template signal by the number of cycles is achieved. Even when the amplitude of the periodic signal component included in the processing target signal is small, a correlated signal having a high S/N ratio is acquired. Thus, this signal processing device reduces constraints on the place of installation of the target object and the physical quantity acquisition unit.

Also, according to this signal processing device, signal processing can be carried out when the target object is in the steady state. Therefore, a desired correlated signal can be acquired without changing the operation state of the target object.

What is claimed is:
1. A signal processing method comprising:
   a processing target signal generation step of generating a processing target signal that is a time-series signal, based on a source signal that is a time-series signal corresponding to a physical quantity generated in a steady state of a target object; and
   a correlated signal generation step of performing correlation filter processing between a template signal that is a time-series signal generated based on the source signal, and the processing target signal, and generating a correlated signal that is a time-series signal,
wherein the source signal includes a plurality of signal components that are cyclic, and the plurality of signal components have different cycles from each other,
a time length of the template signal is longer than a cycle of a first signal component of the plurality of signal components and shorter than a time length of the processing target signal, and
a difference between the time length of the processing target signal and the time length of the template signal is longer than the cycle of the first signal component.

2. The signal processing method according to claim 1, wherein
the template signal is a signal acquired by multiplying a signal sliced out of the source signal by a window function.

3. The signal processing method according to claim 1, further comprising
a template signal generation step of generating the template signal, based on the source signal.

4. The signal processing method according to claim 1, wherein
the template signal is updated.

5. The signal processing method according to claim 1, wherein
the template signal is not updated.

6. The signal processing method according to claim 1, wherein
the template signal is a signal based on a signal of a first period sliced out of the source signal, and
the processing target signal is a signal based on a signal of a second period that is sliced out of the source signal and does not overlap the first period.

7. The signal processing method according to claim 1, wherein
the template signal and the processing target signal have a same sampling cycle.

8. The signal processing method according to claim 1, wherein
at least one of the template signal and the processing target signal is a signal with a DC component eliminated.

9. The signal processing method according to claim 1, wherein
the correlation filter processing is a multiply-accumulate operation with the template signal and the processing target signal, and
an envelope of the correlated signal and an envelope of the processing target signal are nonlinear.

10. The signal processing method according to claim 9, wherein
the multiply-accumulate operation is FIR filter processing on the processing target signal, and
a coefficient of the FIR filter processing is defined based on the template signal.

11. The signal processing method according to claim 1, wherein
the correlated signal generation step incudes
setting a first template signal as the template signal, performing correlation filter processing between each of the first to N-th template signals each of which is a time-series signal generated based on the source signal, and the processing target signal, to generate first to N-th correlated signals, and adding up, averaging, or computing a weighted average of the first to N-th correlated signals to generate the correlated signal,
N being an integer equal to or greater than 2.

12. The signal processing method according to claim 1, further comprising
a waveform analysis step of analyzing a waveform of the correlated signal.

13. The signal processing method according to claim 12, wherein
the waveform analysis step includes analyzing the waveform, focusing on a frequency or a cycle of a cyclic signal included in the correlated signal.

14. The signal processing method according to claim 13, wherein
the waveform analysis step includes performing frequency analysis of the correlated signal to calculate the frequency.

15. The signal processing method according to claim 13, wherein
the waveform analysis step includes calculating the cycle, based on a time interval between a plurality of feature points of the cyclic signal.

16. The signal processing method according to claim 12, further comprising
an abnormality determination step of determining whether the target object has an abnormality or not, based on a result of the analysis in the waveform analysis step.

17. A signal processing device comprising:
a processing target signal generation circuit generating a processing target signal that is a time-series signal, based on a source signal that is a time-series signal corresponding to a physical quantity generated in a steady state of a target object;
a storage circuit storing a template signal that is a time-series signal generated based on the source signal; and
a correlated signal generation circuit performing correlation filter processing between the template signal and the processing target signal and generating a correlated signal that is a time-series signal,
wherein the source signal includes a plurality of signal components that are cyclic, and the plurality of signal components have different cycles from each other,
a time length of the template signal is longer than a cycle of a first signal component of the plurality of signal components and shorter than a time length of the processing target signal, and
a difference between the time length of the processing target signal and the time length of the template signal is longer than the cycle of the first signal component.

* * * * *